United States Patent [19]
Wada et al.

[11] Patent Number: 5,258,859
[45] Date of Patent: Nov. 2, 1993

[54] IMAGE REPRODUCING SYSTEM

[75] Inventors: Shigeru Wada, Kishiwada; Michihiro Iwata, Sakai; Yoshinobu Kudo, Osaka; Manabu Inoue, Kobe; Nobuyuki Taniguchi, Nishinomiya, all of Japan

[73] Assignee: Minolta Camera Kabushiki Kaisha, Osaka, Japan

[21] Appl. No.: 556,528

[22] Filed: Jul. 24, 1990

[30] Foreign Application Priority Data

Jul. 25, 1989 [JP] Japan .................. 1-193618

[51] Int. Cl.$^5$ .................. H04N 1/04; H04N 1/00
[52] U.S. Cl. .................. 358/487; 358/400; 358/909
[58] Field of Search .............. 358/487, 474, 471, 400, 358/401, 488, 452, 453, 909, 448; 354/106, 195.12; 355/18, 19, 43, 45, 232

[56] References Cited

U.S. PATENT DOCUMENTS

| | | |
|---|---|---|
| 3,490,844 | 1/1970 | Sapp, Jr. . |
| 4,482,924 | 11/1984 | Brownstein . |
| 4,485,406 | 11/1984 | Brownstein . |
| 4,506,300 | 3/1985 | Fearnside . |
| 4,603,966 | 8/1986 | Brownstein . |
| 4,716,470 | 12/1987 | Levine .................. 358/400 |
| 4,728,978 | 3/1988 | Inoue et al. . |
| 4,780,735 | 10/1988 | Taniguchi et al. . |
| 4,929,971 | 5/1990 | Imura et al. .................. 354/75 |
| 4,982,213 | 1/1991 | Kazami et al. .................. 354/195.12 |

FOREIGN PATENT DOCUMENTS

60-145428 9/1985 Japan .
1-289948 11/1989 Japan .

Primary Examiner—Edward L. Coles, Sr.
Assistant Examiner—Thomas D. Lee
Attorney, Agent, or Firm—Burns, Doane, Swecker & Mathis

[57] ABSTRACT

An image reproducing system which can automatically output only a portion of an image recorded on a film which conforms to trimming information set upon photographing as an electric image signal without the necessity of a manual operation. The image reproducing device comprises means for detecting an image recorded on a film, means for reading trimming information of the image, the trimming information being recorded on a record medium when the image has been recorded on the film and representing a condition of reproduction of the image, means for generating an electrical image signal in accordance with the image detected by the detecting means, and means for controlling an output of the electrical image signal to be generated by the generating means in accordance with the trimming information read by the reading means.

8 Claims, 21 Drawing Sheets

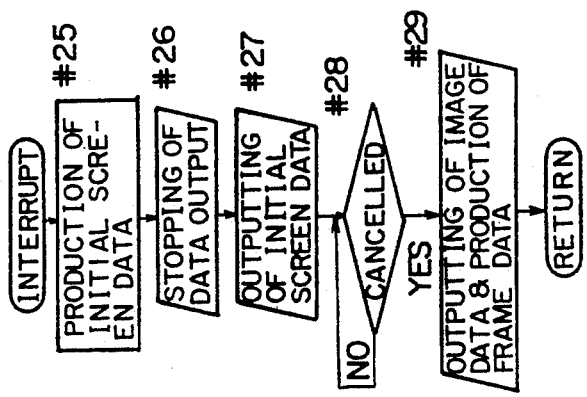
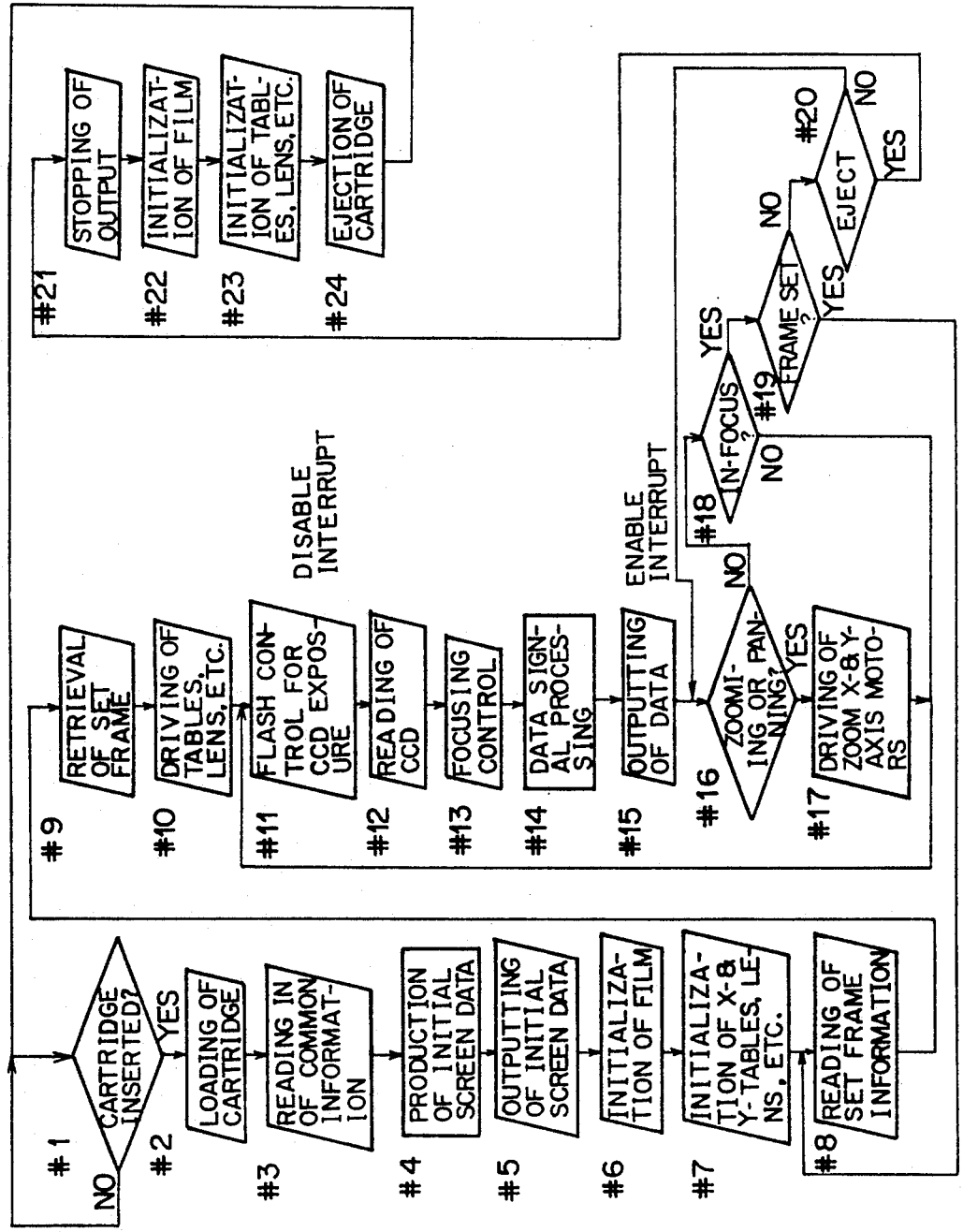

FIG. 20
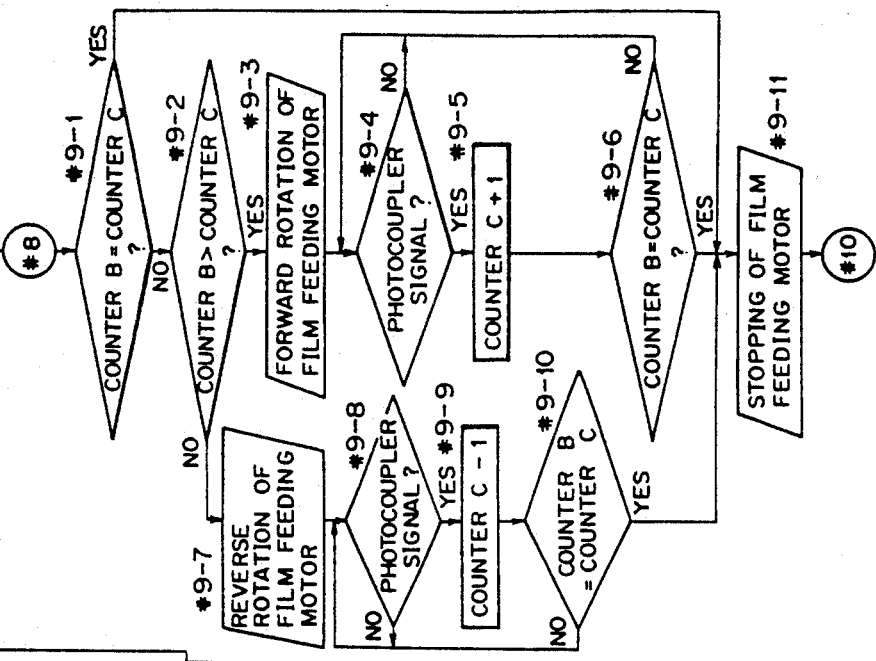
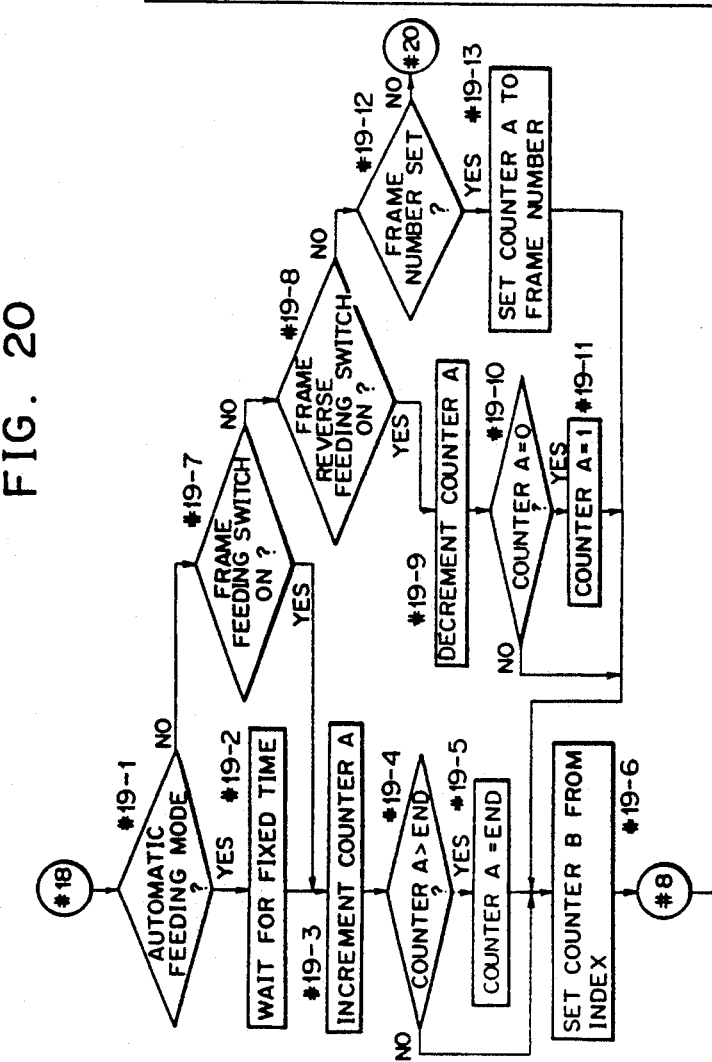

IMAGE REPRODUCING SYSTEM

BACKGROUND OF THE INVENTION

1. Field of the Invention

This invention relates to a system for reproducing an image recorded on a photographed film.

2. Description of Related Art

Systems are already known wherein am image on a film is picked up by image pickup means and outputted as a video signal. Such systems are disclosed, for example, in U.S. Pat. Nos. 4,485,406, 4,506,300 and 4,603,966 and Japanese Patent Laid-Open No. 79236/1984. In such systems, a condition of an optical system located from the film to the image pickup means is changed by a manual operation of an operator so that a desired part of an image on the film is projected on the image pickup means.

Different systems are disclosed, for example, in U.S. Pat. No. 3,490,844 and Japanese Patent Laid-Open Nos. 50748/1987 and 208028/1987 filed by the assignee of the present patent application. In those systems, trimming information set upon photographing is recorded on a film or a semiconductor memory, and when an image on the film is to be projected onto photographic paper, a projecting optical system is controlled in accordance with the trimming information so that only a desired area of the image which is not to be trimmed may be projected onto photographic paper.

In the case of the former systems, a desired part of a picture on a film can be projected onto the image pickup means only by a manual operation, and a film which is photographed by a camera having a trimming function (or pseudo focal length photographing function) to which the present invention is directed is not suitably applicable to those systems. On the other hand, in the case of the latter systems, while only it is disclosed that an image on a film is printed on photographic paper, no system is disclosed wherein an image on a film is converted into a video signal and appreciated, for example, on a television screen as is directed by the present invention.

SUMMARY OF THE INVENTION

It is an object of the present invention to provide an image reproducing system which can automatically reproduce only a desired portion of an image recorded on a film which conforms to trimming information set upon photographing as an image signal without the necessity of a manual operation.

It is another object of the present invention to provide an image reproducing system which can automatically output only a portion of an image recorded on a film which conforms to trimming information set upon photographing as an electric image signal without the necessity of a manual operation.

It is a further object of the present invention to provide an image reproducing system which can output only a desired portion of an image recorded on a film which is selected by a manual operation as an electric image signal and the desired image portion is automatically controlled so that it may not be protruded from the range of the image recorded on the film.

In order to attain the objects, according to the present invention, there is provided an image reproducing device which comprises means for detecting an image recorded on a film, means for reading trimming information of the image, the trimming information being recorded on a record medium when the image has been recorded on the film and representing a condition of reproduction of the image, means for generating an electrical image signal in accordance with the image detected by the detecting means, and means for controlling an output of the electrical image signal to be generated by the generating means in accordance with the trimming information read by the reading means.

With the image reproducing device, only an area of a frame of a film which has been intended to be photographed upon photographing, such as, for example, an area which has been confirmed by way of a viewfinder, can be outputted as an image signal without a manual operation of the device. Accordingly, a picture intended by a photographer can be appreciated automatically.

The above and other objects, features and advantages of the present invention will become apparent from the following description and the appended claims, taken in conjunction with the accompanying drawings in which like parts are denoted by like reference characters all through the drawings.

BRIEF DESCRIPTION OF THE DRAWINGS

FIG. 16a is a flow chart illustrating operation of a sequence controlling section of the electric circuit of FIG. 13, and FIG. 16b is a flow chart illustrating an interrupt routine of operation of the sequence controlling section;

FIG. 17 is a flow chart illustrating detailed contents of operation at step #13 of the flow chart of FIG. 16a;

FIG. 18 is a flow chart illustrating detailed contents of operation at steps #16 and #17 of the flow chart of FIG. 16a;

FIG. 20 is a flow chart illustrating detailed contents of operation at steps #9 and #19 of the flow chart of FIG. 16a.

DESCRIPTION OF THE PREFERRED EMBODIMENT

Figure 1:
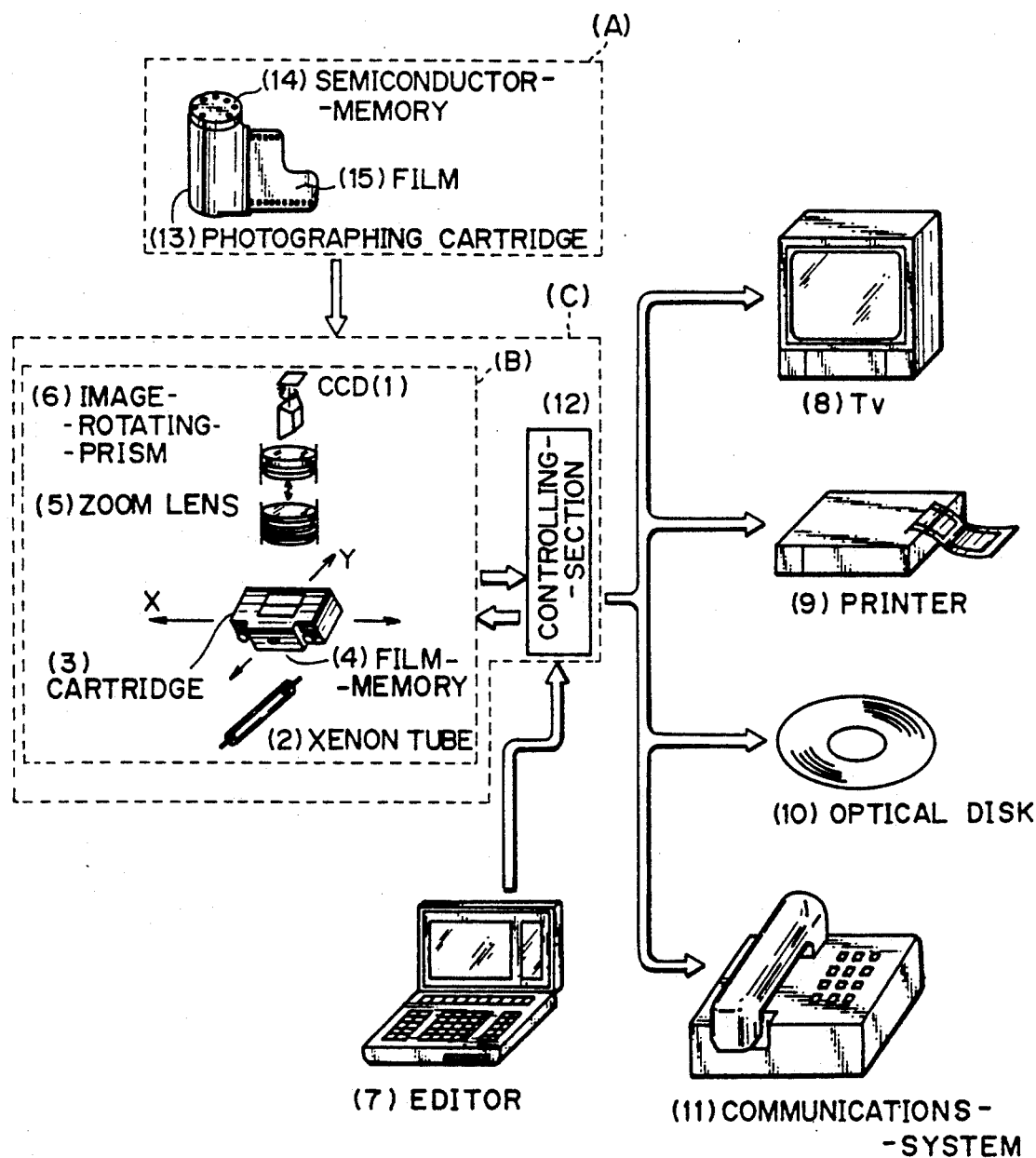
FIG. 1 is a diagrammatic representation showing a system to which the present invention is directed.

Referring first to FIG. 1, there are shown a general construction of a system to which the present invention is directed and flows of information in the system. FIG. 1 includes a block A indicated by a broken line and showing a form of a film when a photograph is taken using a camera. In particular, a semiconductor memory 14 and a film 15 are accommodated in a photographing cartridge 13. Information peculiar to the film and information inputted by way of the camera upon photographing are stored in the semiconductor memory 14. Such photographing cartridge 13 and semiconductor memory 14 and information thereof are disclosed in detail in Japanese Patent Laid-Open Application No. 289948/1989 or U.S. Ser. No. 488,999 filed on Mar. 6, 1990 by the assignee of the present patent application.

The film 15 is removed from the photographing cartridge 13 and then developed, whereafter it is accommodated into an appreciation cartridge 3. Meanwhile, various information stored in the semiconductor memory 14 is transferred to another semiconductor memory 4 accommodated in the appreciation cartridge 3.

The system shown in FIG. 1 includes an apparatus C for converting information of the film 15 and memory 4 accommodated in the cartridge 3 into a video signal and includes a driving section B and a controlling section 12 for controlling the driving section B. The cartridge 3 is removably loaded into the apparatus C. The driving section B of the apparatus C includes mechanisms for moving a cartridge 3 in perpendicular X and Y directions, a frame feeding mechanism for feeding a film frame by frame, a zoom lens 5 and an image rotating prism 6 and driving mechanisms for them, an image pickup CCD (charge coupled device) 1, and a xenon tube 2 for emitting light for illuminating the photographed film. The zoom lens 5 is provided to change the trimming magnification of an image on a film while the moving mechanisms for the cartridge 3 in the X and Y directions are provided to move the center of trimming. The image rotating prism 6 is provided to rotate an image so that the image may be erected on a television screen irrespective of a format upon photographing thereof. In particular, when the camera is held with respect to ordinary horizontal format photographing to effect vertical format photographing, the image will lie horizontally on a television display screen. The image rotating prism 6, however, rotates the image thus photographed in a vertical format so that an erected image thereof may be displayed on a television screen. Meanwhile, since the xenon tube 2 is used for the illumination, the amount of heat generation is low comparing with an incandescent lamp, and consequently, a cooling fan is unnecessary, which will facilitate miniaturization of the apparatus. Also there is an advantage that the amount of light can be controlled readily.

The controlling section 12 controls the driving section B in accordance with information from the film memory 4 or information from an editor 7 connected to the apparatus C and also in accordance with a signal from an operated one of manually operable switches not shown. The controlling section 12 also executes processing of an electric video image signal obtained by way of the CCD 1. An electric signal obtained by such processing is transmitted to a television set 8 so that an image may be displayed on a display screen of the television set 8. Meanwhile, the electric signal may be transmitted to a printer 9 so that an image may be printed on paper. Further, it is also possible to effect such processing of the image signal as data compression and record the thus processed image signal onto an optical disk or to transmit such image information to a remote location making use of communication means 11 such as a visual telephone system.

Figure 2:
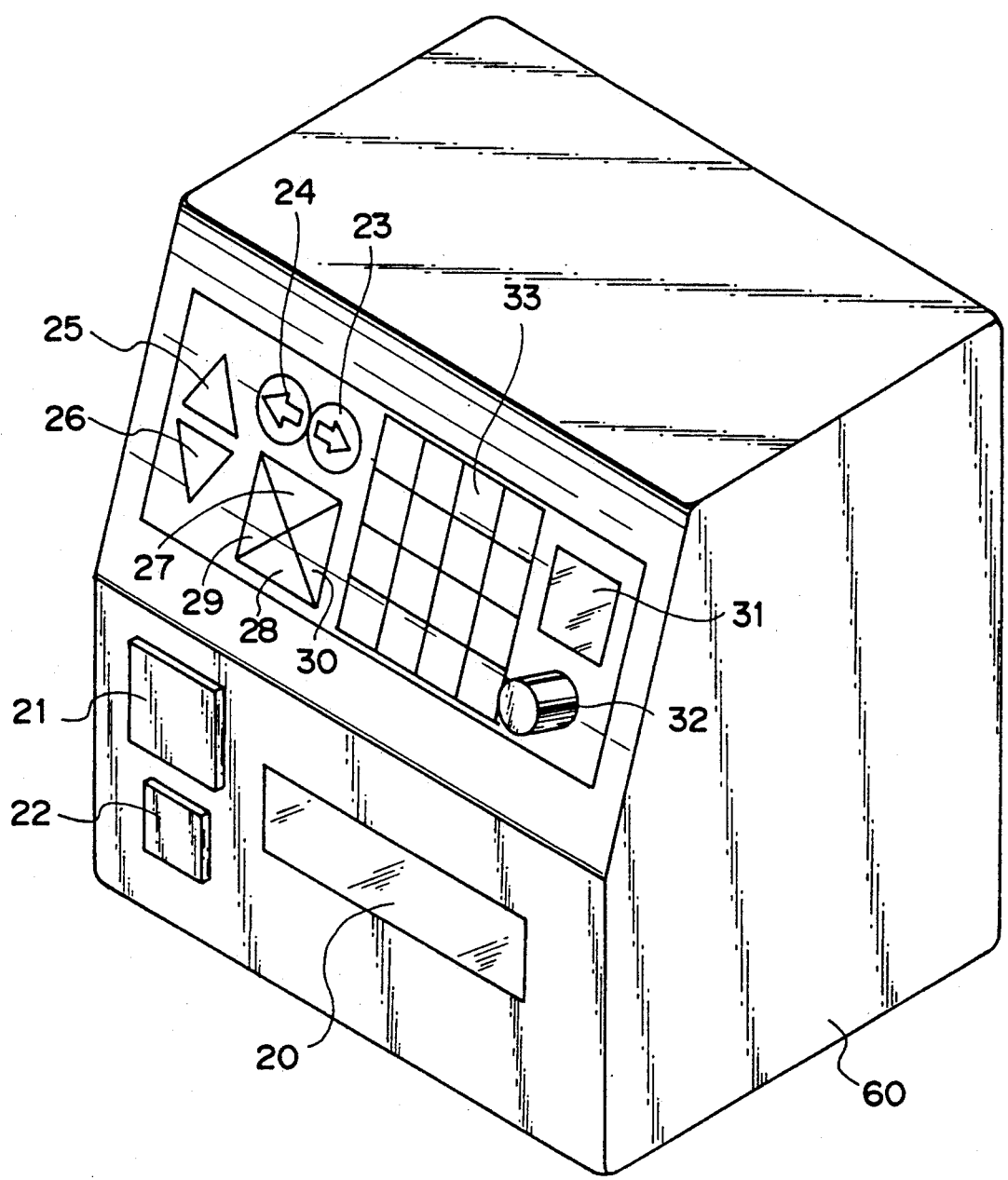
FIG. 2 is a perspective view of an image reproducing apparatus to which the present invention is applied.

Referring now to FIG. 2, there is shown an appearance of a video signal converting apparatus to which the present invention is applied. The video signal converting apparatus includes a housing 60 having a cartridge loading opening 20 formed therein. Various manually operable members are provided on a front wall of the housing 60 and include a power source switch 21, a cartridge ejecting button 22, a frame feeding button 23, a frame reverse feeding button 24, a zoom up button 25, a zoom down button 26, upward, downward, leftward and rightward panning buttons 27, 28, 29 and 30, a manual operation button 31 for cancelling an automatic playing mode of the apparatus, an adjusting knob 32 for the adjustment of contrast, and ten keys 33 for directly entering a numerical value of a serial frame number or the like.

Here, operation of the apparatus is described. First, the power source switch 21 will be turned on, and then a cartridge 3 will be inserted into the loading opening 20 of the housing 60. Consequently, the cartridge 3 is loaded in position into the apparatus.

Immediately after such loading of the cartridge 3, various information (frame information, trimming information and so forth) is read in from the memory 4 of the cartridge 3. Then, the film of the cartridge 3 is rewound once to set the film to an initial condition, and then, the film is fed to the first frame position to start reading of images from the film.

When the power source is made available, the apparatus is automatically put into an automatic playing mode. Thus, after then, the images on the film are reproduced successively frame by frame while automatically performing zooming, panning, vertical-horizontal format conversion (image rotation) and so forth in accordance with the various information read in from the memory 4.

If the manual operation button 31 is depressed, then the apparatus is put out of the automatic playing mode to thereafter permit manual control of the apparatus. Consequently, if the frame feeding button 23 is depressed subsequently, then the film is fed to a next frame position, but otherwise if the frame reverse feeding button 24 is depressed, then the film is fed to a preceding frame position. If the zoom up button 25 or zoom down button 26 is depressed, then desired zooming can be effected. On the other hand, if the upward, downward, leftward or rightward panning button 27, 28, 29 or 30 is manually operated, then panning to a desired position can be effected.

If the cartridge ejecting button 22 is depressed, then the film in the cartridge is rewound to its initial condition, and then the cartridge 3 is ejected from the housing 60 of the apparatus.

It is to be noted that only frame feeding may be performed otherwise in response to a manual operation even when the apparatus is in an automatic playing mode.

Figure 3:
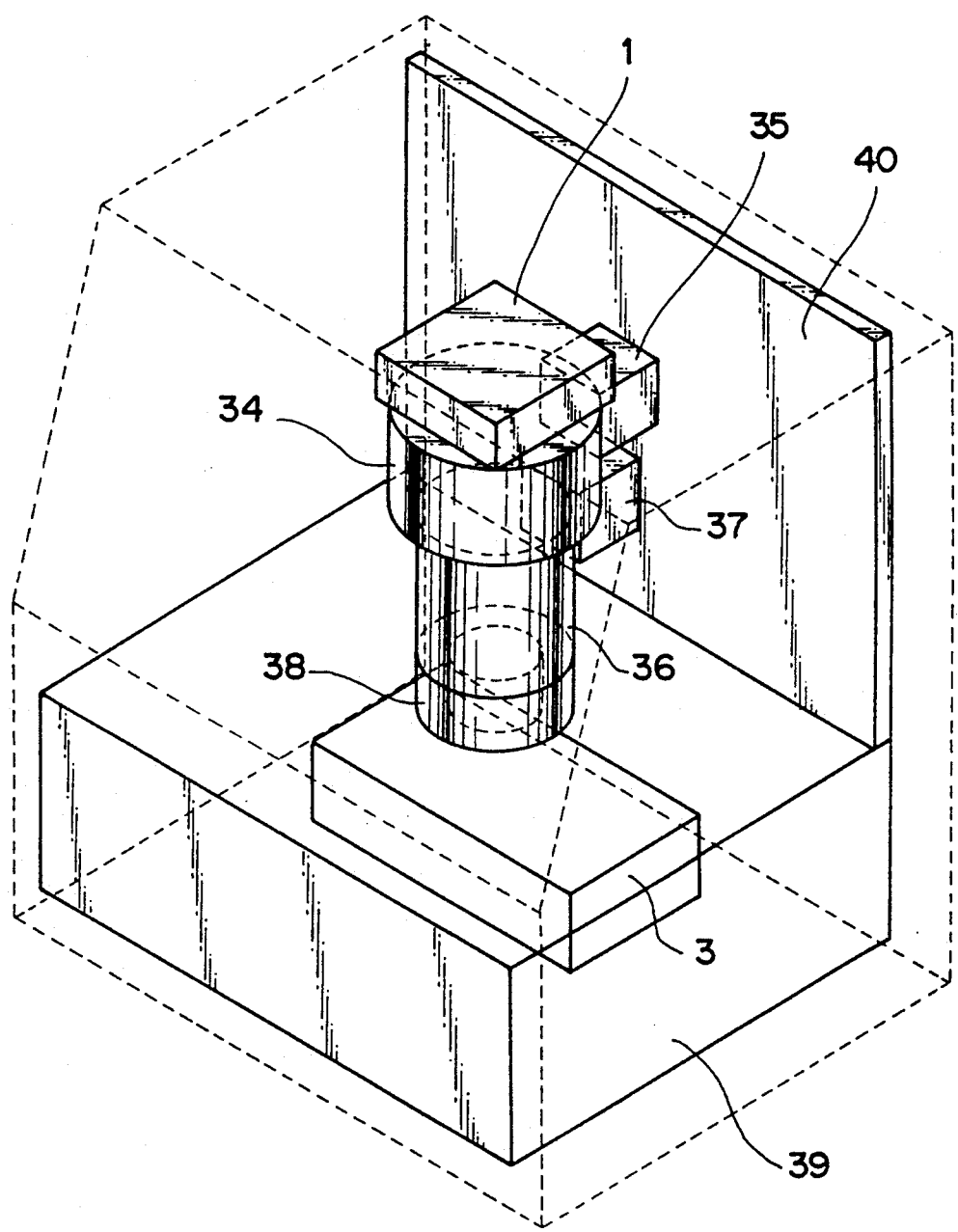
FIG. 3 is a schematic view showing an arrangement of different functional blocks of the apparatus shown in FIG. 2.

Referring now to FIG. 3, there is shown mechanical construction of the apparatus. The apparatus mechanism includes a holding member 34 for holding the image rotating prism 6 thereon, a driving mechanism block 35 for driving the holding member 34 to rotate, a lens barrel block 36 for holding the zoom lens 5 thereon, another driving mechanism block 37 for driving the lens barrel block 36, a focusing lens and a driving mechanism 38 for the focusing lens, X- and Y-tables which will be hereinafter described and a driving mechanism 39 for the X- and Y-tables, and a control circuit board 40 for the various mechanisms.

The apparatus mechanism further includes the CCD 1 described hereinabove, and a holding member not shown for holding the cartridge 3 thereon.

Figure 4A:
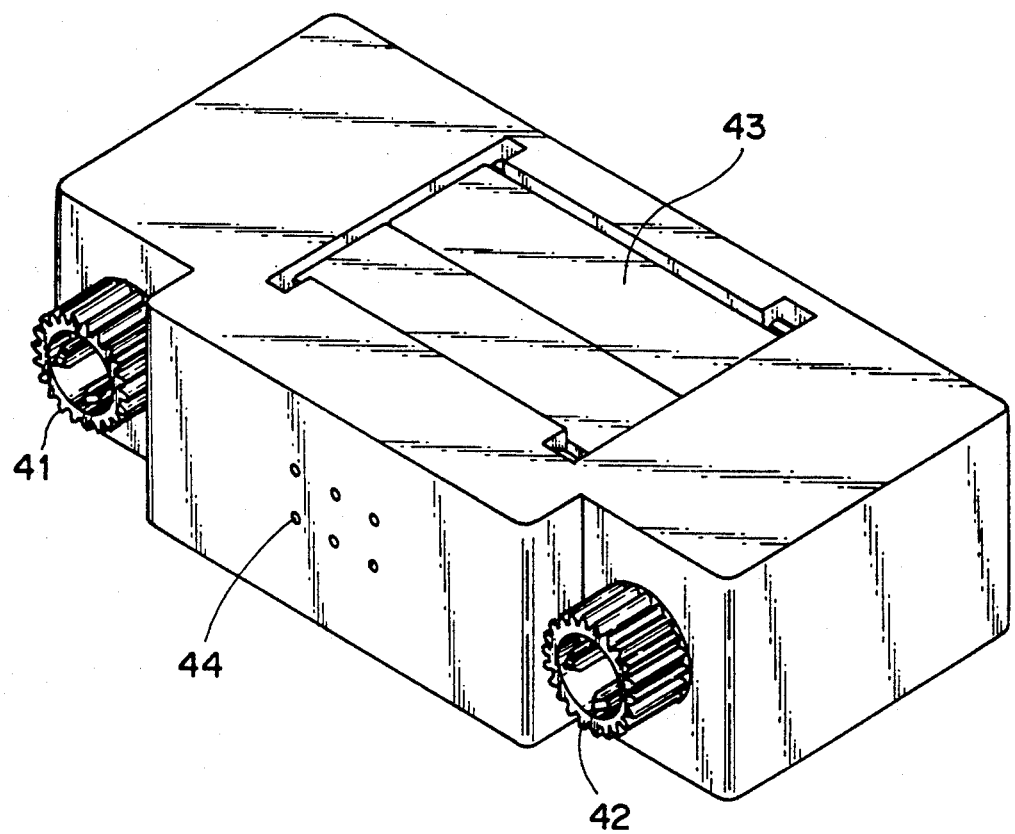
FIGS. 4a and 4b are an upper perspective view and a lower perspective view, respectively, of a film cartridge for use with the apparatus shown in FIG. 2.
Figure 4B:
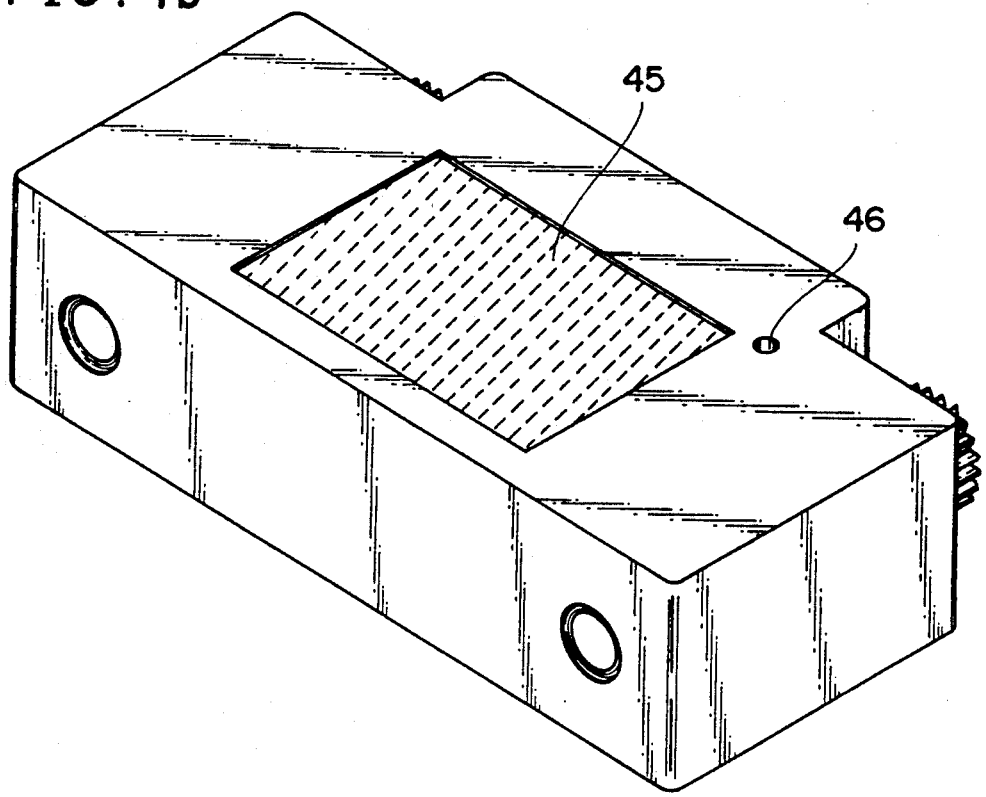

Referring now to FIGS. 4a and 4b, there is shown an appearance of the cartridge 3. The cartridge 3 includes a pair of spools 41 and 42 for engaging with the film driving mechanism of the apparatus. The cartridge 3 further includes a cartridge shutter 43 for preventing dust or the like from entering the inside of the cartridge 3. The cartridge 3 has a plurality of, six in the arrangement shown, contact portions 44 by way of which information is to be transmitted to the apparatus. The cartridge 3 further includes a transparent diffusing plate 45 for transmitting therethrough light from the xenon tube 2 which serves as a light source of the apparatus. The cartridge 3 further has a detection hole 46 formed therein so that a photo-interruptor not shown in either of FIGS. 4a and 4b may count a mark applied to the film for each frame by way of the detection hole 46 in order to detect an amount of the film fed.

Figure 5C:
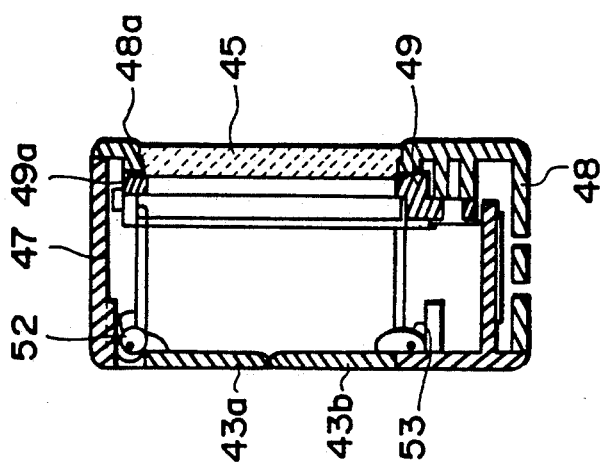
FIGS. 5a, 5b, 5c and 5d are sectional views showing internal structure of the film cartridge shown in FIGS. 4a and 4b.
Figure 5A:
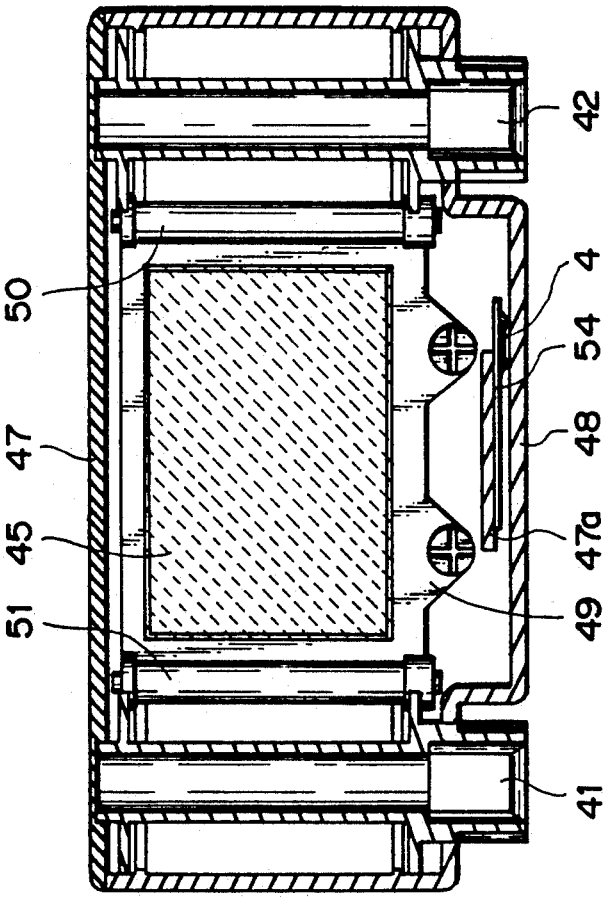
Figure 5B:
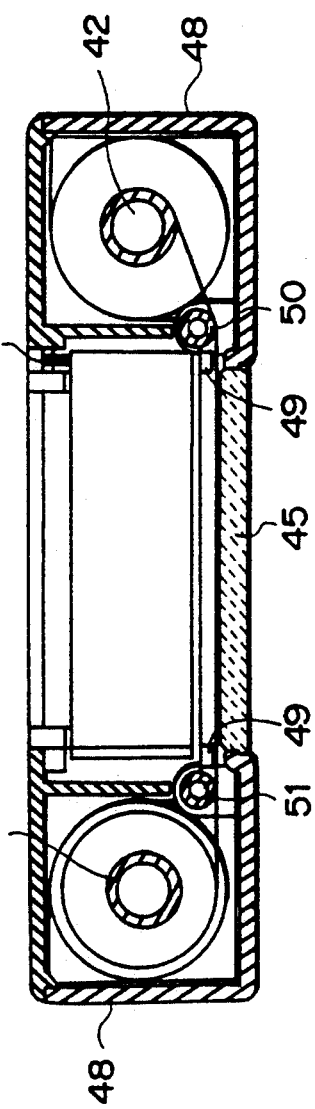
Figure 5D:
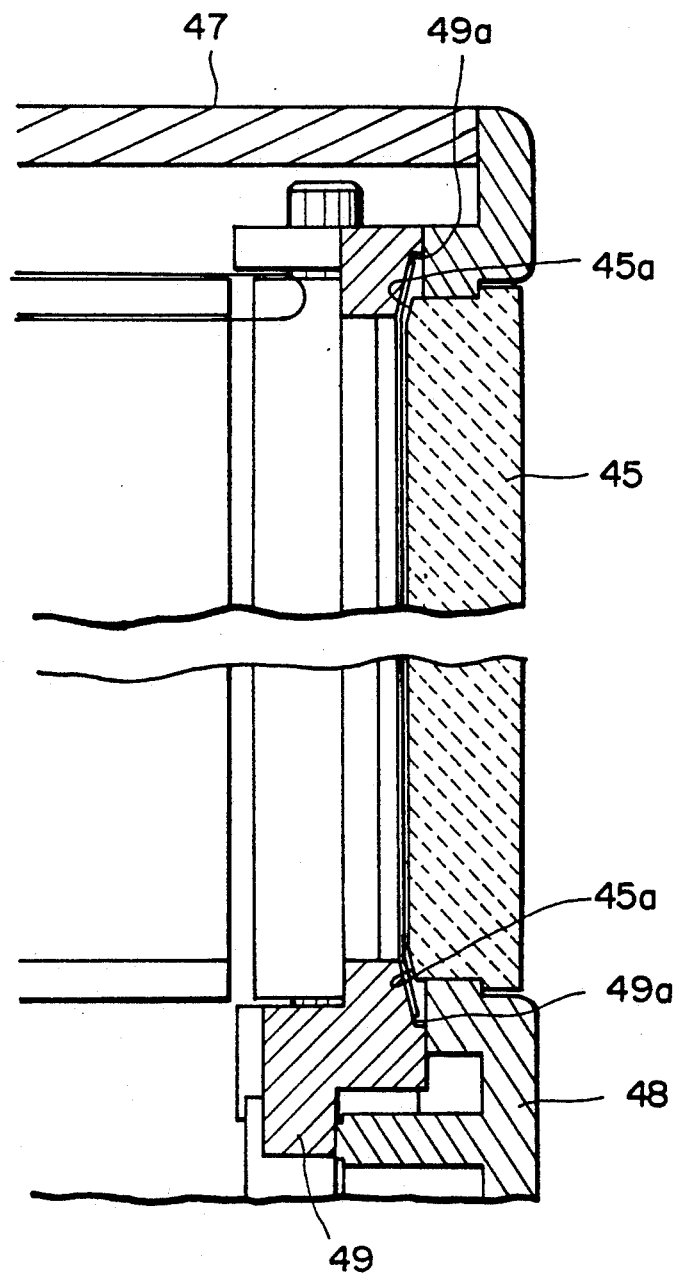

Referring now to FIGS. 5a to 5d, there is shown internal structure of the cartridge 3. The cartridge 3 includes an upper housing 47 and a lower housing 48. The cartridge 3 further includes a film guide member 49 secured to the lower housing 48 and having a pair of rail faces 49a corresponding to film guide rail faces 48a formed on the lower housing 48. The film guide member 49 also serves as bearings for a pair of guide rollers 50 and 51. The guide rail faces 49a and upper and lower end portions 45a of the transparent diffusing plate 45 opposing to the guide rail faces 49a are tapered as seen in FIG. 5d so that a film may not rub on the transparent diffusing plate 45 in order to prevent the film from being damaged. One of a pair of opposite faces of the transparent diffusing plate 45 has a lens configuration while the other face is formed as a diffusing face.

A pair of cartridge shutter members 43a and 43b which cooperatively constitute the cartridge shutter 43 are mounted for pivotal motion on the upper housing 47 and are normally urged in their closing direction by a pair of springs 52 and 53, respectively. A board mounting portion 47a for mounting an in-cartridge memory board 54 thereon and for receiving a pressing force from a contact pin (not shown) on the apparatus is provided on the upper housing 47.

Figure 6:
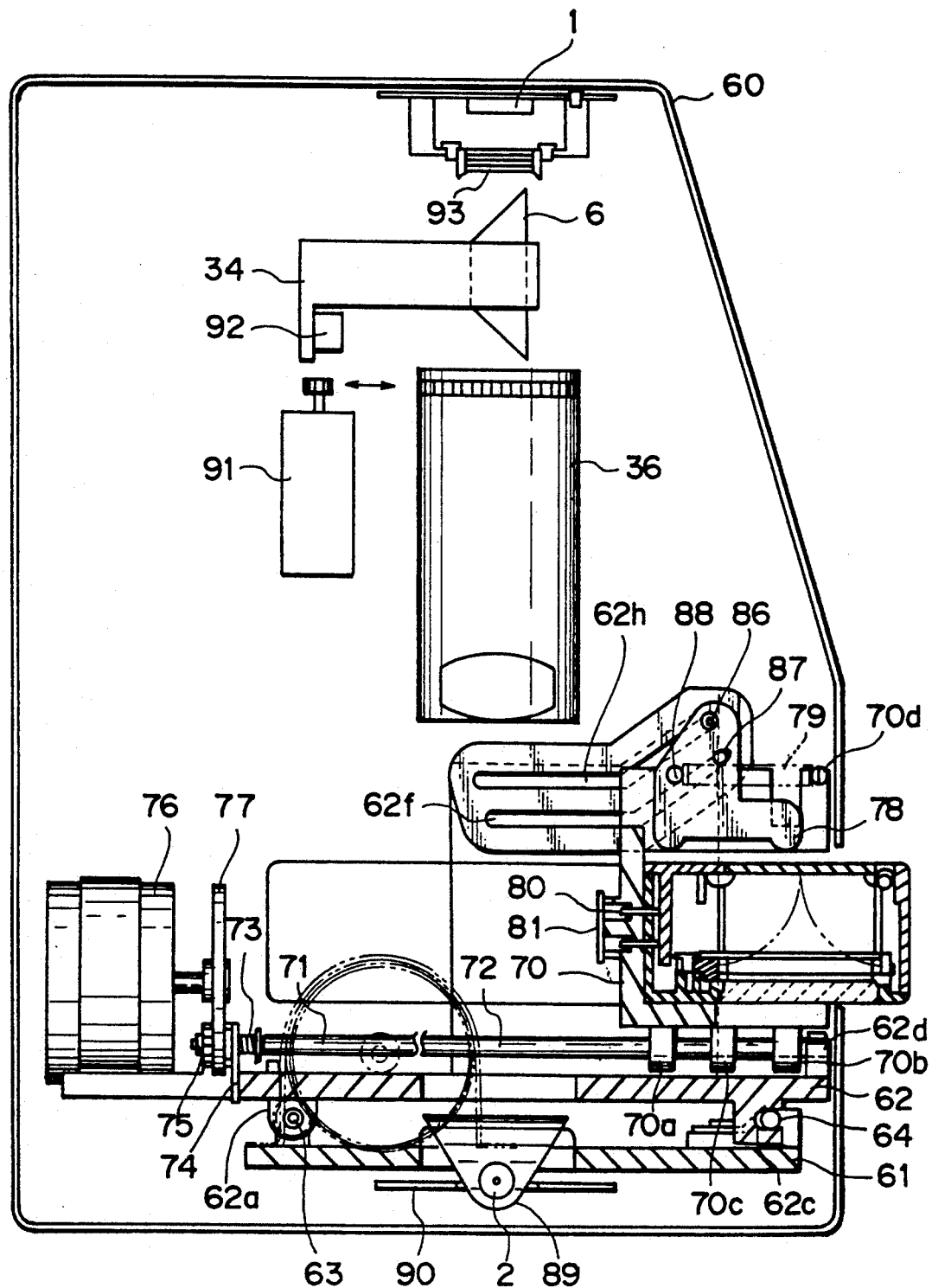
FIG. 6 is a schematic side elevational sectional view of internal structure of the apparatus of FIG. 2.
Figure 7:
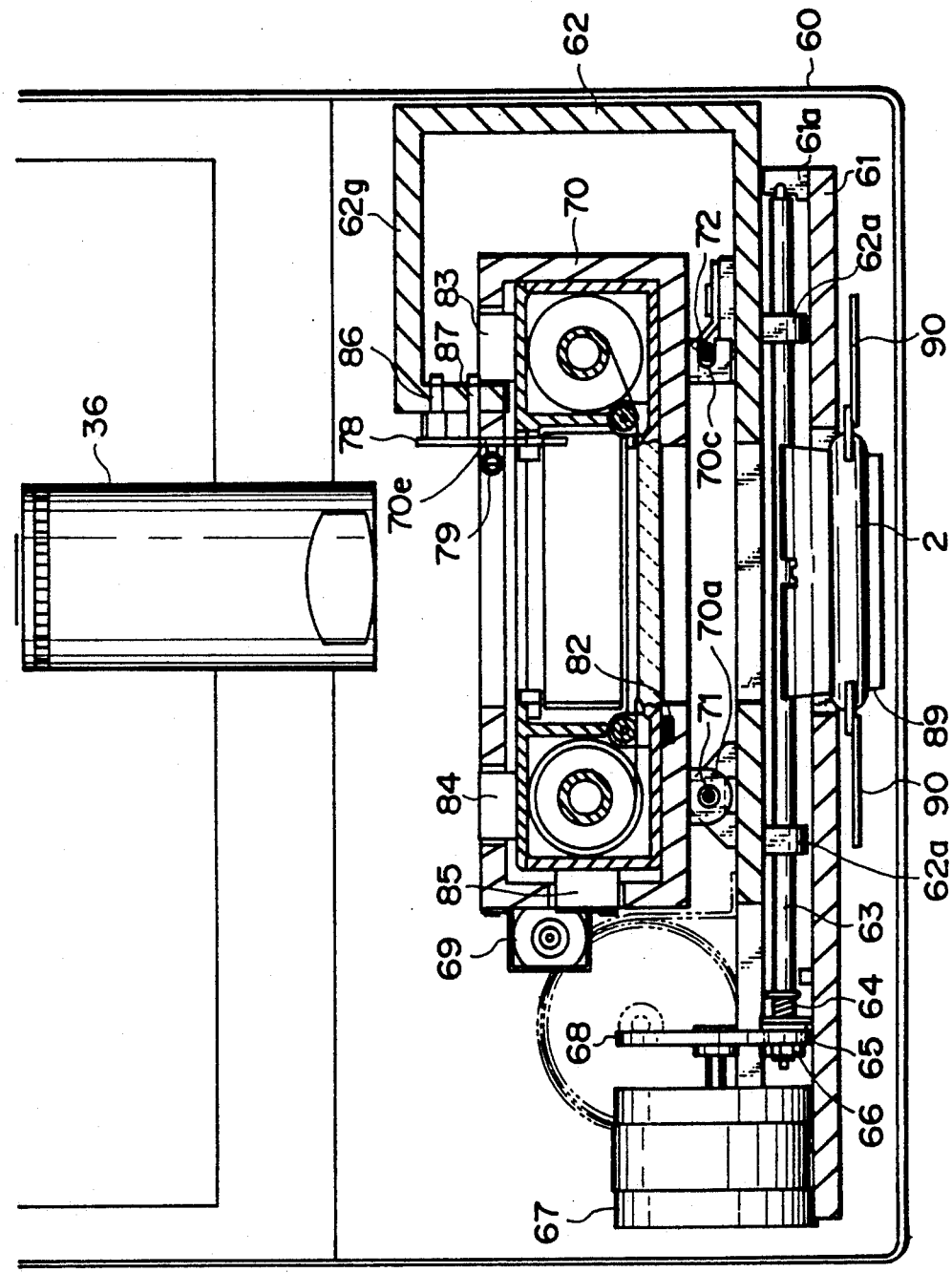
FIG. 7 is a schematic front elevational sectional view of the internal structure of the apparatus of FIG. 2.

Referring now to FIGS. 6 and 7, principal mechanisms of the present video signal converting apparatus are shown more in detail. The apparatus includes a mechanism chassis 61 disposed in the inside of the housing 60 for mounting the X-Y table mechanism thereon. An X-table 62 for moving a cartridge 3 in the X direction is mounted on the mechanism chassis 61. The X-table 62 includes a pair of female screw portions 62a and 62b held in meshing engagement with a feed screw 63 for feeding the X-table 62 in the X direction, a U-shaped groove portion 62c held in fitting engagement with a slide guide 64 extending in the X direction on the mechanism chassis 61, and a mounting portion 62d on which a Y-table 70 and a driving mechanism for driving the Y-table 70 are mounted.

The feed screw 63 is supported for rotation at an end thereof on a bearing portion 61a of the mechanism chassis 61 and at the other end thereof on a bearing plate 65 secured to the mechanism chassis 61. A compression spring 64 is interposed between the feed screw 63 and the bearing plate 65 and normally urges the feed screw 63 in one direction, that is, toward the bearing portion 61a of the mechanism chassis 61 to eliminate a possible play in a feeding direction of the feed screw 63. A possible play between the feed screw 63 and the female screws 62a is also taken up by known means not shown.

A drive gear 66 is mounted on the feed screw 63 and held in meshing engagement with a motor gear 68 mounted on an output shaft of an X-axis motor 67.

A film feeding control motor 69 is mounted on the Y-table 70 which can move a cartridge 3 in the Y direction perpendicular to the X direction. The Y-table 70 includes a pair of female screw portions 70a and 70b held in meshing engagement with another feed screw 71 for feeding the Y-table 70 in the Y direction, and a U-shaped groove portion 70c held in fitting engagement with a slide guide 72 extending in the Y direction on the Y-table 70.

The feed screw 71 is supported for rotation at an end thereof on the mounting portion 62d of the X-table 62 and at the other end thereof on a bearing plate 74 secured to the X-table 62. A compression spring 73 is interposed between the feed screw 71 and the bearing plate 74 and normally urges the feed screw 71 in one direction, that is, toward the bearing portion 62d of the X-table 62 so as to eliminate a possible play in a feeding direction of the feed screw 71. Also, a possible play between the feed screw 71 and the female screws 70a and 70b is taken up by known means not shown.

A drive gear 75 is mounted on the feed screw 71 and held in meshing engagement with a motor gear 77 mounted on an output shaft of a Y-axis motor 76.

The Y-table 70 has a guide face 70e formed in an integral relationship thereon for guiding the cartridge shutter 43 in the thicknesswise direction of an opening and closing lever 78. The guide face 70e has a pin portion 70d formed thereon, and a tension spring 79 extends between the pin portion 70d and the opening and closing lever 78. The guide face 70e further has a contacting portion formed thereon for contacting with the opening and closing lever 78.

The Y-table 70 further has a mounting portion on which a signal board 81 and a plurality of signal pins 80 for the connection to the memory board of a cartridge are mounted. A photo-interruptor 82 for detecting a feed mount of a film is also mounted on the Y-table 70, and a cartridge is retained in position on the Y-table 70 by means of retaining springs 83, 84 and 85.

The X-table 62 has an arm 62g formed has in an integral relationship thereon. The arm 62g has a pair of cam grooves 62h formed therein for engaging with a pair of pins 86 and 87, respectively, on the opening and closing lever 78.

The opening and closing lever 78 has a pin 88 formed thereon for arresting the other end of the tension spring 79 remote from the pin portion 70d of the Y-table 70.

A reflector 89 for reflecting light from the xenon tube 2 which serves as an illuminating light source for the pickup of an image and a flash controlling circuit board 90 are also mounted on the mechanism chassis 61.

The zoom lens barrel 36, image rotating prism 6 and image pickup CCD 1 are disposed above the driving mechanism described above, and the zoom lens barrel 36 is driven to move by a zoom driving motor 91. A light receiving element 92 for the light measurement is mounted on the holding member 34 while a low-pass filter 93 is disposed adjacent the CCD 1.

Subsequently, operation of the apparatus upon loading of a cartridge will be described with reference to FIGS. 8 to 11.

Figure 8:
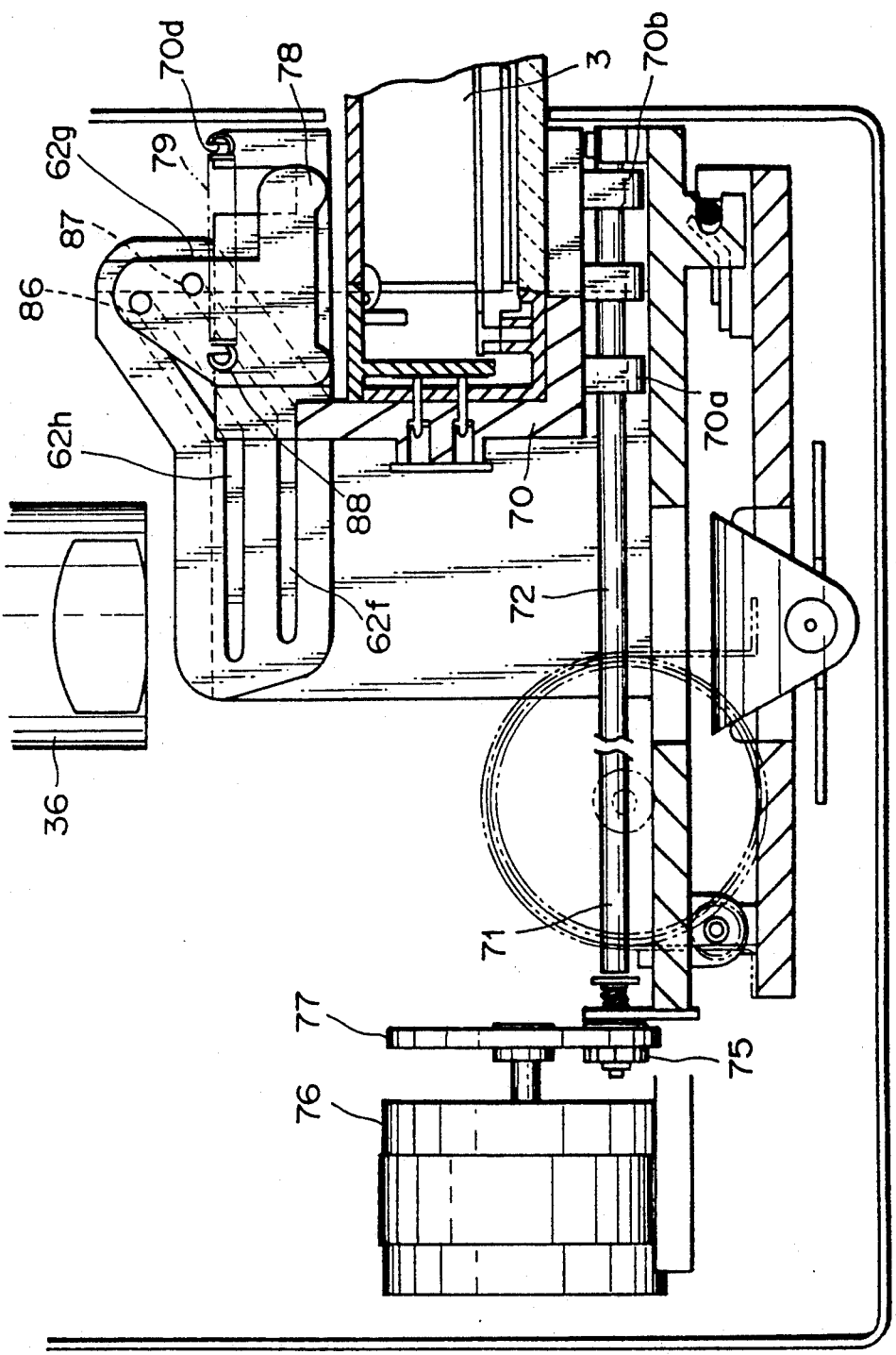
FIGS. 8, 9, 10 and 11 are partial sectional views showing the internal structure of the apparatus of FIG. 2 at different positions upon loading of a cartridge.

If a cartridge 3 is inserted into the cartridge loading opening 20, it is held in position with respect to the Y-table 70 by the holding springs 83, 84 and 85 as seen in FIG. 8.

Simultaneously, a cartridge loading detecting switch not shown operates to detect loading of the cartridge 3. Consequently, the Y-axis motor 76 is energized to rotate in response to a signal from the sequence controlling circuit so that the Y-table 70 is moved in the cartridge loading direction (in the leftward direction in FIG. 8) by the feed screw 71.

After starting of the movement of the Y-table 70, the pin 70d thereon is also moved in the leftward direction in FIG. 8, but the opening and closing lever 78 is not moved due to an action of the tension spring 79.

Figure 9:
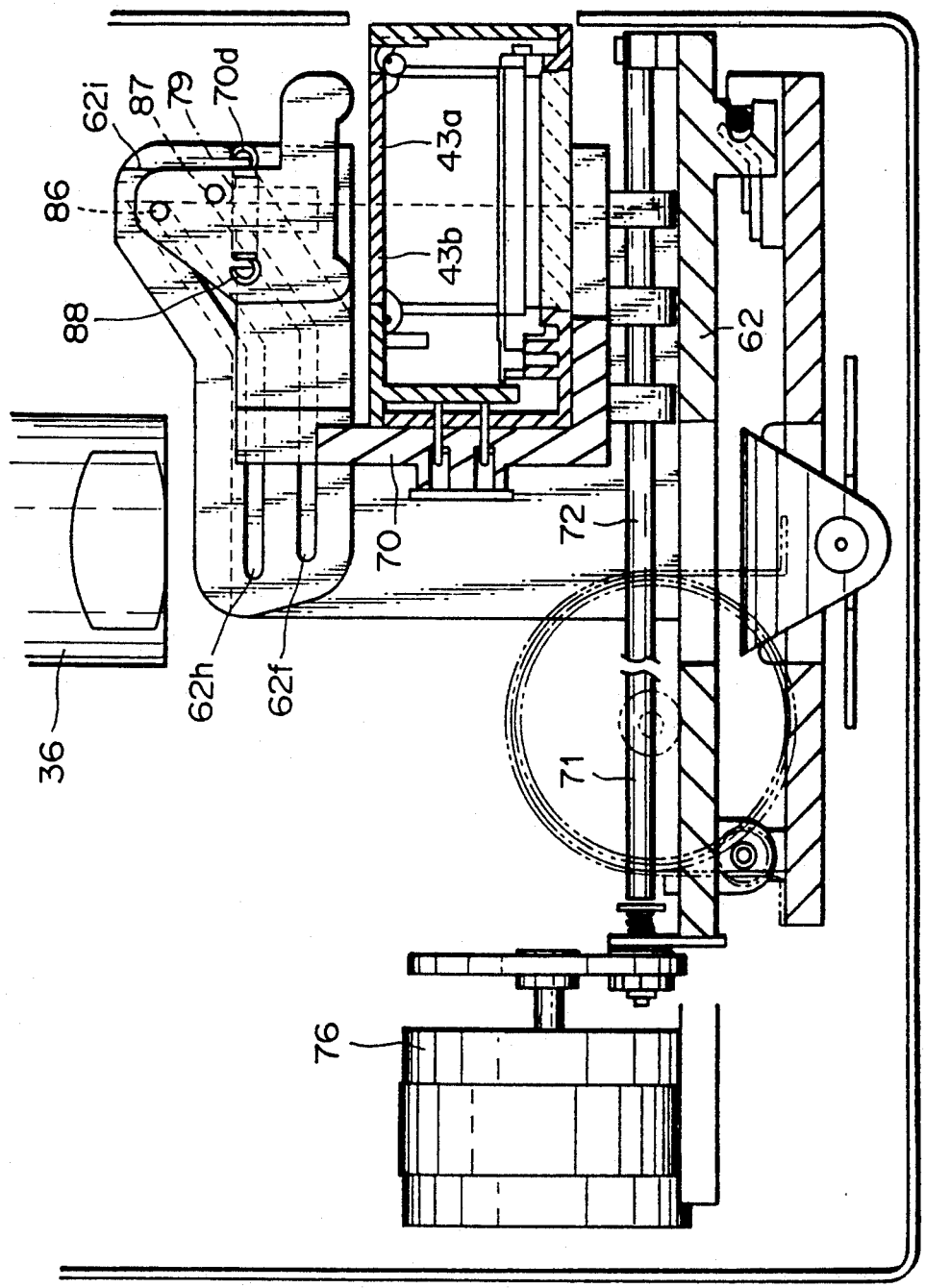
Figure 10:
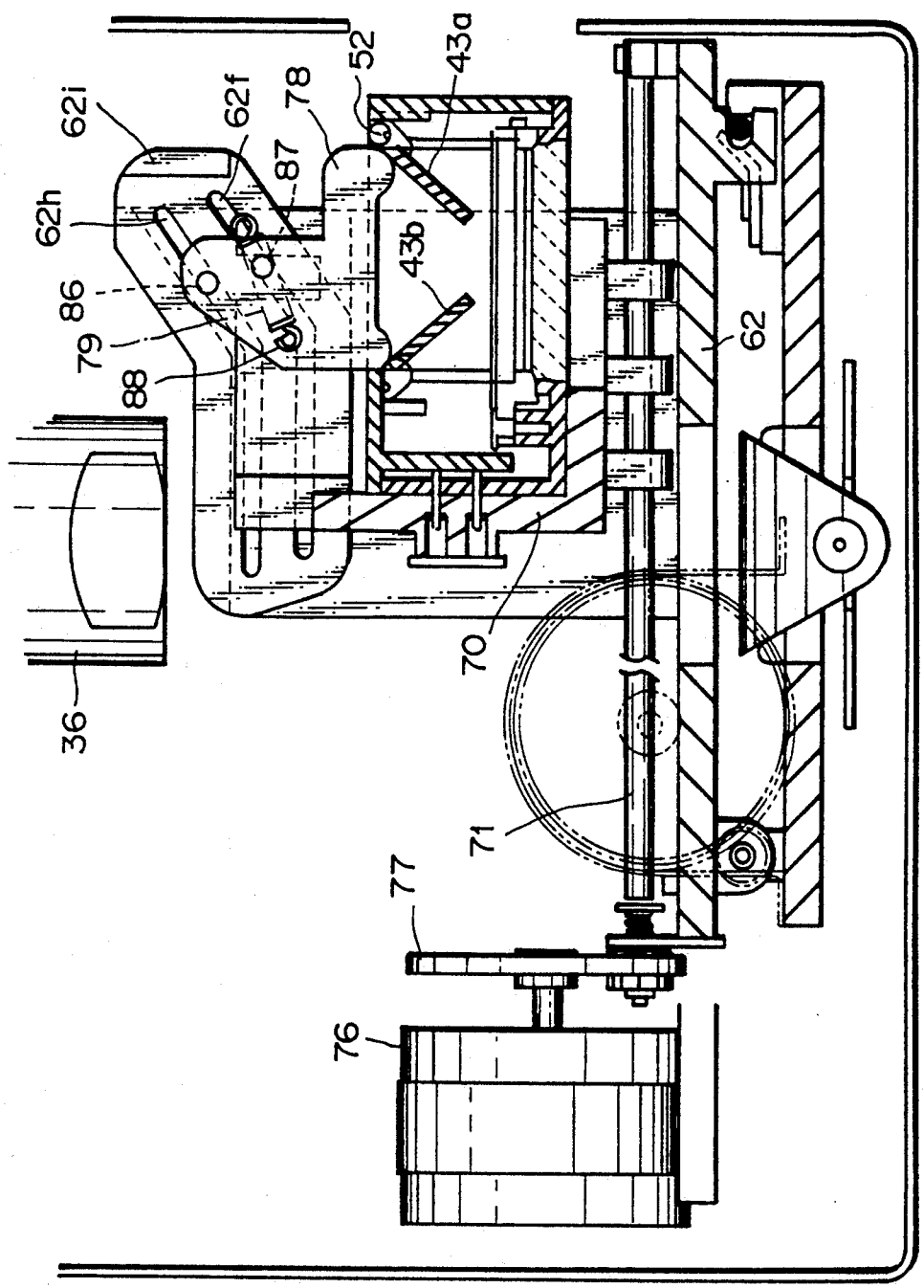

After the Y-table 70 is moved until the contacting portion thereof is contacted with an opposing end portion of the opening and closing lever 78, the Y-table 70 and the opening and closing lever 78 move in an integral relationship with each other until a condition shown in FIG. 9 is reached.

In the condition shown in FIG. 9, the end portion of the opening and closing lever 78 is just opposed to the shutter 43 of the cartridge 3. Then, when the Y-table 70 and the opening and closing lever 78 are further moved leftwardly in FIG. 9, the pins 86 and 87 on the opening and closing lever 78 are guided by the cam grooves 62h and 62f on the X-table 62, respectively, so that they are moved also downwardly as seen from FIG. 10. Consequently, also the opening and closing lever 78 is moved downwardly to push upon areas of the cartridge shutter members 43a and 43b outside an image pickup area to open the shutter 43 as seen in FIG. 11, thereby completing the loading operation of the cartridge 3.

If the cartridge ejecting button 17 is depressed, the sequence of movements described above proceeds reversely.

In particular, the X-axis motor 67 is first rendered operative to move the X-table 62 to a position corresponding to the cartridge insertion opening 20, and then the Y-table 70 is moved in its cartridge ejecting direction (in the rightward direction in FIGS. 8 to 11) by the Y-axis motor 76.

Figure 11:
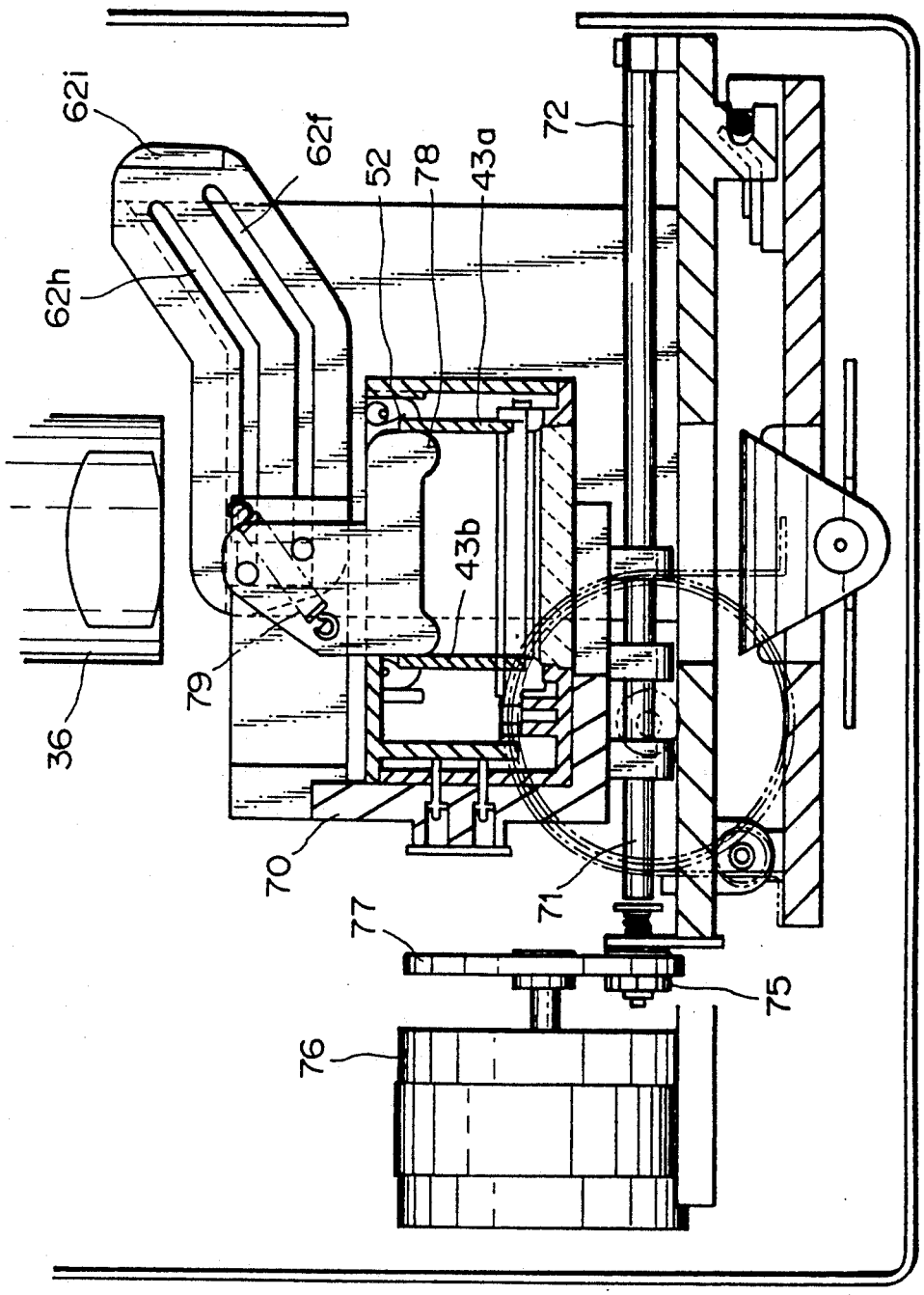

When the Y-table 70 is moved in this manner, the opening and closing lever 78 is moved upwardly in FIG. 11 by an action of the pins 86 and 87 thereon which are guided by the cam grooves 62h and 62f on the X-table 62, respectively, while the cartridge shutter members 43a and 43b are closed by the urging force of the shutter closing springs 52 and 53, respectively.

After an end face of the opening and closing lever 78 is contacted with an upright portion 62i as seen in FIG. 9, the opening and closing lever 78 cannot move rightwardly any more. Consequently, only the Y-table 70 is moved rightwardly further from the position shown in FIG. 9 to the position shown in FIG. 8 while charging the tension spring 79 extending between the opening and closing lever 78 and the Y-table 70.

In the position shown in FIG. 8, the cartridge 3 is partially projected outwardly from the housing 60 of the apparatus. Accordingly, the cartridge 3 can be grasped and removed readily by hand.

It is to be noted that, while in the embodiment described above loading of a cartridge is performed by movement of the Y-table 70, the apparatus may otherwise include a separate mechanism for such loading.

Further, while the present embodiment employs an image rotating prism as a mechanism for the vertical-horizontal format conversion of a picked up image, the CCD itself serving as an image pickup element may otherwise be rotated or turned.

Further, naturally the opening and closing mechanism for the cartridge shutter is not limited to such method as employed in the present embodiment described above.

Figure 12A:
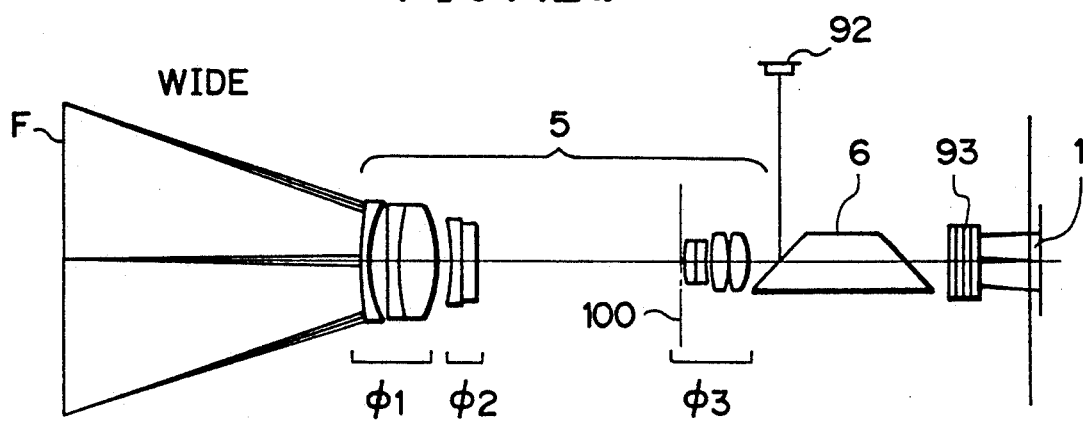
FIGS. 12a, 12b and 12c are diagrammatic views of an optical system of the apparatus of FIG. 2 showing a zoom lens at wide, middle and tele photographing positions, respectively.
Figure 12B:
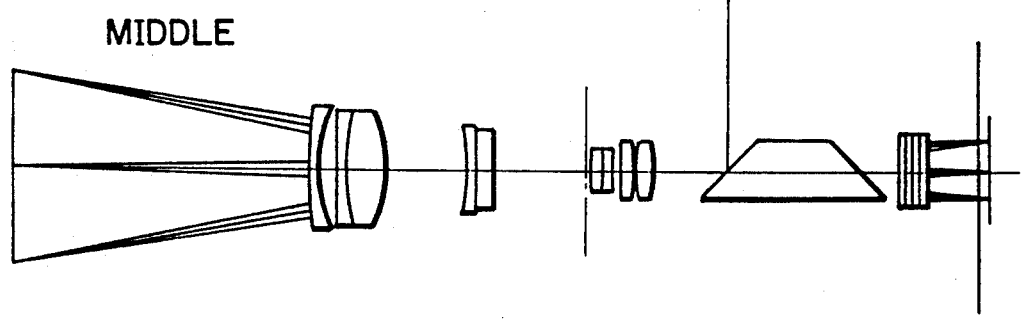
Figure 12C:
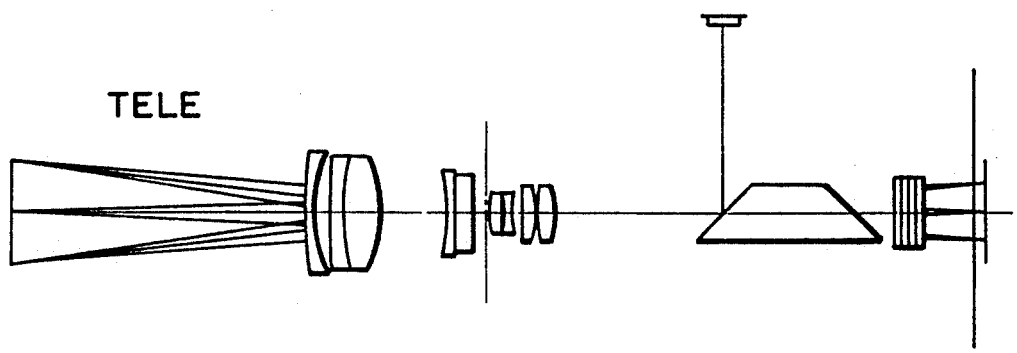

Referring now to FIGS. 12a to 12c, there is shown an optical system for reading an image on a film after development by means of the CCD 1. The optical system shown is in the form of a zoom lens for a finite distance and reads, in the case of FIG. 12a, an image of the full size (object height: 21.6 mm) of a film by means of the CCD for a half inch (image height: 4 mm). In FIG. 12b, the optical system reads an image having an object height of 13.3 mm, and then in FIG. 12c, the optical system reads an image having an object height of 7.2 mm. Thus, the entire optical system 5 is constructed as a zoom optical system for the magnification of 3 times. The zoom optical system 5 is composed of a first lens group $\phi_1$ which is fixed during zooming and has a positive refractive power, a second lens group $\phi_2$ which is moved in a U-turn from the wide side to the tele side, acts as a compensator and has a negative refractive power, and a third lens group $\phi_3$ which is moved forwardly to the film side (leftwardly in FIGS. 12a to 12c) from the wide side to the tele side, acts as a variator and has a positive refractive power. The first lens group $\phi_1$ is moved along the optical axis of the optical system 5 to effect focusing operation. Further, in the present optical system, in order to facilitate vertical-horizontal format conversion of a picture, the Dove prism 6 is interposed as an image rotating optical system between the lens system and the CCD 1. In order to construct the Dove prism 6 with a comparatively small size, preferably the Dove prism 6 is disposed adjacent the CCD 1 at which the diameter of an image circle is comparatively small while a diaphragm aperture 100 for the optical system is disposed in the third lens group $\phi_3$. Meanwhile, in order to dispose the Dove prism 6 and the low-pass filter 93 between the lens system and the CCD 1, the lens system must necessarily have a long back focal distance. In the present embodiment, the distance from a film plane F to a top end of the lens system is about 43 mm; the length of the entire lens system in the wide side (shortest focal length condition) is about 55 mm; and the distance from a rear end of the lens system to the CCD 1 is about 40 mm including the Dove prism 6 and the low-pass filter 93.

It is to be noted that a modified Abbe's prism, a Pechan prism, or some other prism may be used as the image rotating optical system instead of the Dove prism.

Vertical-horizontal format conversion of a picture can be achieved otherwise by rotating the CCD 1. In this instance, the image rotating prism 6 is unnecessary, and consequently, a long back focal distance is not required for the lens system. However, where the image rotating prism 6 is employed, the base furface of the film F is disposed in an opposing relationship to the CCD 1 because a leftwardly and rightwardly turned over image is projected onto the CCD 1, but where the image rotating prism 6 is not employed, a film F must be disposed with the emulsion surface thereof opposed to the CCD 1. Or, it is also possible to electrically effect leftward and rightward turning over of an image after the image is converted into an electric image signal, or to effect leftward and rightward turning over of an image using some other optical system.

In the present embodiment, measurement of light is effected using part of light which passes through the lens system. In particular, in the present embodiment, part or an entirety of an incidence surface of the Dove prism 6 is formed as a half-mirror surface so as to form a passage of light for the light measurement in a direction perpendicular to the optical axis of the optical system in order to introduce light into the light receiving element (SPD) 92 for the light measurement. The incidence surface of the Dove prism 6 may otherwise have a transmitting portion and a separate reflecting portion.

Figure 13:
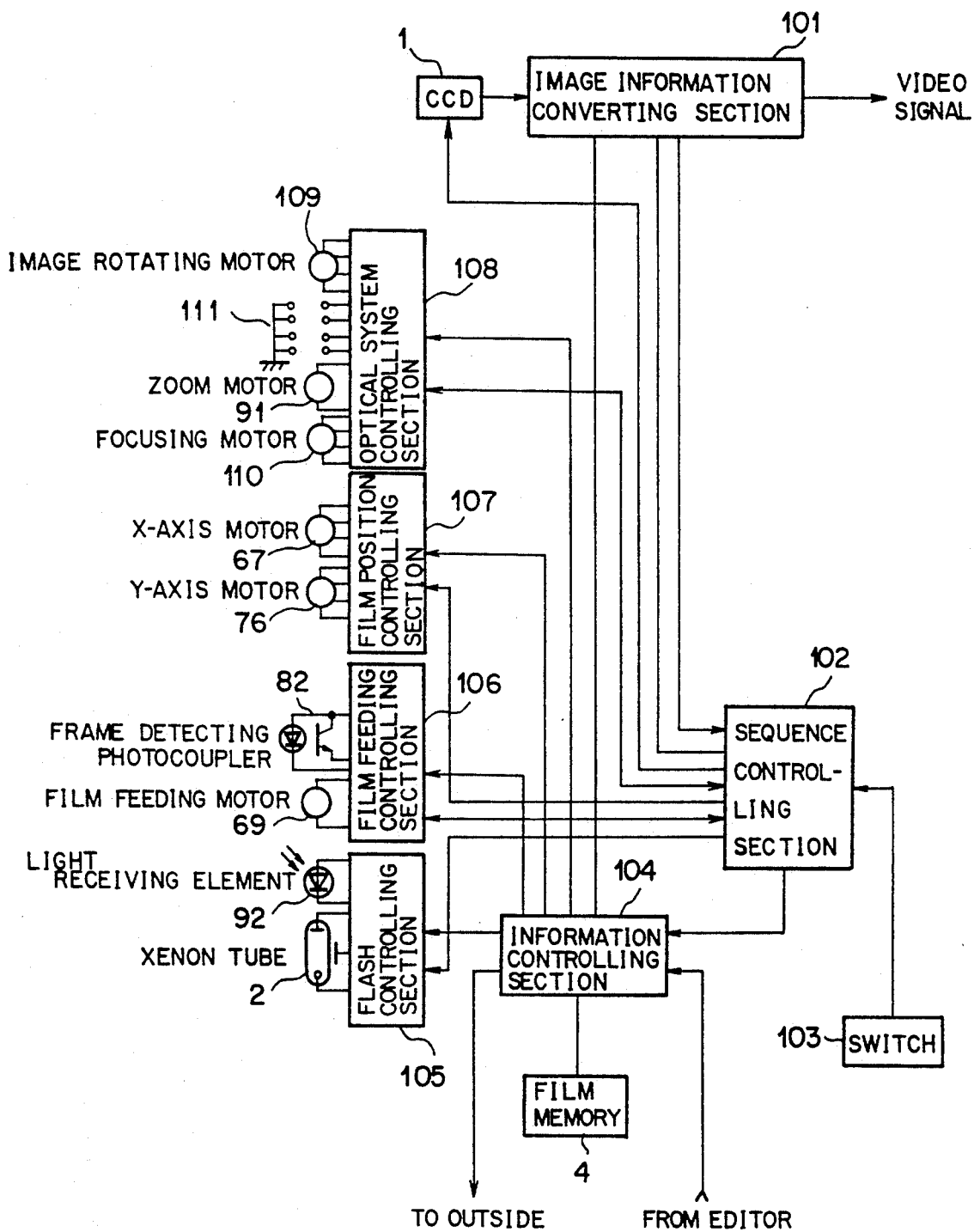
FIG. 13 is a block diagram of an electric circuit of the apparatus of FIG. 2.

Referring now to FIG. 13, there is shown detailed construction of the controlling section 12 of the video signal converting apparatus C described above. The controlling section 12 includes an image information converting section 101 which is composed of a first portion for converting information received at the image pickup element CCD 1 and a second portion for producing a signal for the focusing. Details of the image information converting section 101 will be hereinafter described.

An optical system controlling section 108 controls driving of the image rotating prism 6 and the lens system 5 in response to information from an information controlling section 104 and a signal from a sequence controlling section 102.

An image rotating motor 109 rotates the image rotating prism 6 in response to vertical/horizontal format information received from the memory 4 or a signal from the sequence controlling section 102.

The zoom motor 91 moves the lens system 5 in response to trimming magnification information to effect zooming.

An encoder 111 detects a position of the lens 5 moved by the zoom motor 91.

A focusing motor 110 drives the lens system 5 to effect a focusing operation.

A film position controlling section 107 controls driving of the X-axis motor 67 and the Y-axis motor 76 in response to information regarding the center of trimming. It is to be noted that the Y-axis motor 76 also drives the loading mechanism for loading a cartridge 3 as described hereinabove.

A film feeding controlling section 106 controls the film feeding motor 69 in response to retrieval information. In this instance, the number of frames of a film is counted by the frame detecting photocoupler 82. For the detection of a frame of a film, otherwise the number of perforations of a film may be counted, or else, where a partition mark is applied to a film for each frame, the number of such partition marks may be counted.

A flash controlling section 105 controls emission of flashlight of the Xenon tube 2 while monitoring such flashlight by means of the light receiving element (SPD) 92 so that an appropriate amount of exposure light to the CCD 1 may be assured. The information controlling section 104 transmits information from the film memory 4 or editor 7 to various sections of the apparatus and outputs, when the apparatus is connected to some other external device, necessary information to the external device. The sequence controlling section 102 controls driving timings of the various control sections. While driving control of the apparatus is executed in response to information from the film memory 4 or editor 7, a trimming magnification or the trimming center can be modified from the outside by operation of a switching section 103.

It is to be noted that information stored in the film memory 4 includes, as information recorded by way of a camera upon photographing, information regarding a trimming magnification, information indicative of distinction between vertical format photographing and horizontal format photographing, information of a brightness of an object, information of a color temperature, information indicative of whether flashlight or natural light a photographing light source is, information of an exposure reference, a photographing date (date and time), various photographing information including an exposure time, an aperture value, a focal length, a photographing distance, an exposure control mode and so forth, information of the center of trimming (disclosed in Japanese Utility Model Laid-Open No. 145428/1985) and so forth, and as information peculiar to a film, information of a trimming limit, negative/positive information indicative of whether the photographed film is a negative film or a positive film, information indicative of a type of the film (daylight-/tungsten, color/monochrome), information of a film sensitivity (ISO) and so forth. Further, information recorded by way of the editor 7 includes a short sentence, a key word and so forth.

Figure 14:
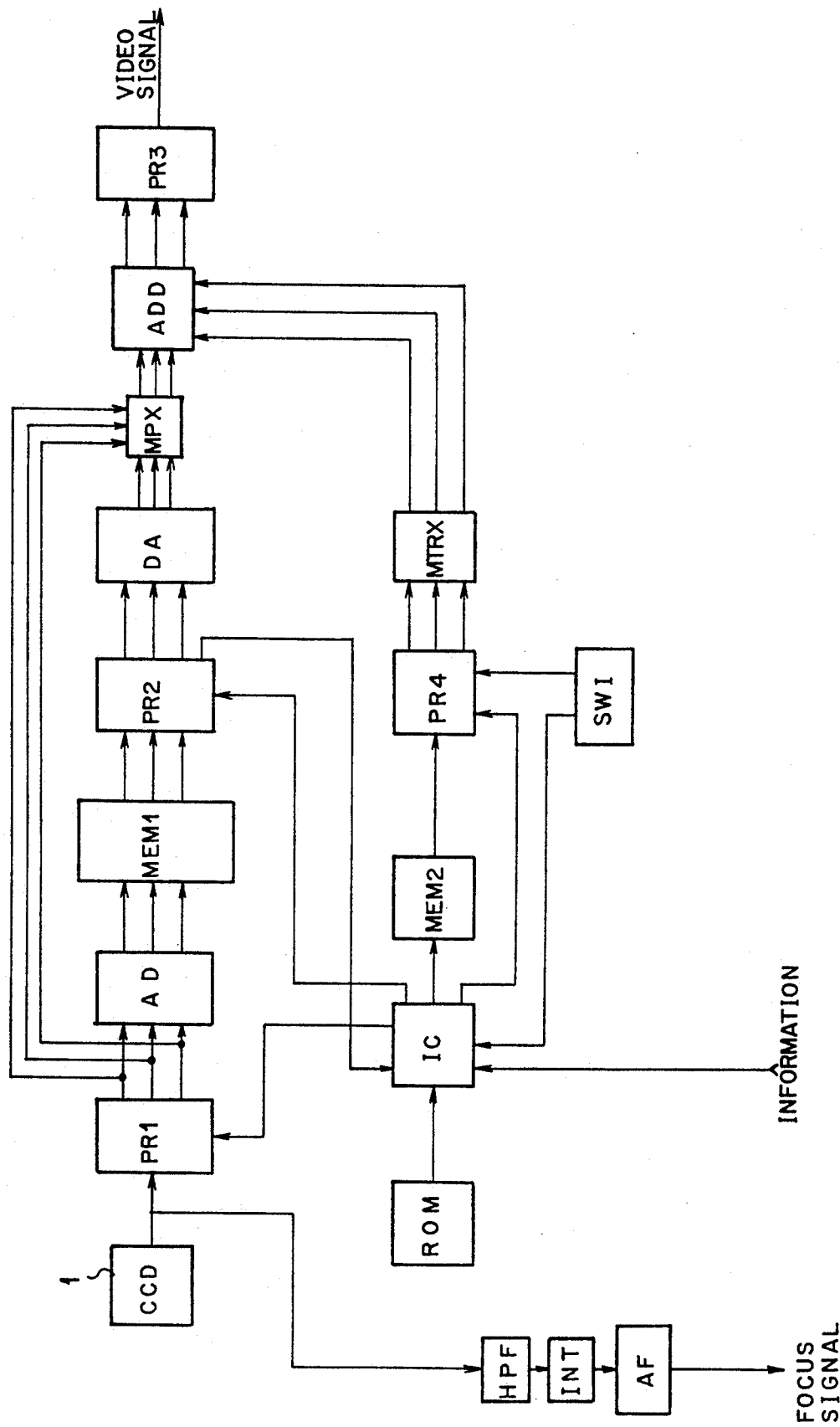
FIG. 14 is a detailed block diagram of an image information converting section of the electric circuit of FIG. 13.

Referring now to FIG. 14, there is shown a detailed electric circuit of the image information converting section 101. The electric circuit shown includes a signal processing circuit PR1 for receiving an output of the CCD 1 and converting the thus received output into a color difference signal and a brightness signal, an analog to digital converter circuit AD for converting an output of the signal processing circuit PR1 from analog signals into digital signals, and a memory circuit MEM1 for storing therein an output of the analog to digital converter circuit AD. The electric circuit further includes another signal processing circuit PR2 for digitally processing a brightness signal and a color difference signal read out from the memory circuit MEM1 in response to a signal from an image controlling section IC. By such signal processing, negative/positive conversion, color adjustment, brightness adjustment and leftward-rightward turning over and so forth can be effected. A digital to analog converter circuit DA converts an output of the signal processing circuit PR2 produced by digital signal processing into an analog brightness signal and an analog color difference signal. The digital to analog converter circuit DA performs, for each 1/60 second, digital to analog conversion of an output of the signal processing circuit PR2, that is, data obtained by digital signal processing of data from the memory circuit MEM1. A multiplexer MPX selects one of an output signal outputted from the signal processing circuit PR1 and an output signal of the digital to analog converter circuit DA and outputs the selected signal to an adding circuit ADD. The adding circuit ADD adds an output of a matrix circuit MTRX which will hereinafter be described to an output of the multiplexer MPX. When it is necessary to repetitively and successively read images from the CCD 1 such as, for example, during zooming or panning, the multiplexer MPX selects a signal from the signal processing circuit PR1, but otherwise when it is required to read an image only once, the multiplexer MPX selects an output signal from the digital to analog circuit DA. In particular, when high speed processing is required, processing is executed while a signal remains in the form of an analog signal, but otherwise when high speed processing is not required but complicated processing is required, digital signal processing is executed by way of the analog to digital converter circuit AD, memory circuit MEM1 and signal processing circuit PR2. The electric circuit shown in FIG. 14 further includes a further signal processing circuit PR3 for converting a color difference signal and a brightness signal outputted from the adding circuit ADD into a video signal.

The image controlling section IC receives information from the film memory 4 or from an image processing input switching section SWI and executes signal processing in accordance with the information received. The electric circuit shown in FIG. 14 further includes a storage circuit ROM in which conversion data are stored in accordance with which information other than image information from the film memory 4, such as, for example, information regarding a photographing date or a key word, is to be converted into a video signal. Another memory circuit MEM2 is provided to store as picture element information for one frame therein data read out from the storage circuit ROM in response to various information. A signal processing circuit PR4 reads out data from the memory circuit MEM2 and converts the thus read out data into analog signals for the primary colors R, G and B. The signal processing circuit PR4 further executes signal processing such as color conversion or brightness adjustment in response to signals from the image controlling section IC and the image processing input switching section SWI. The matrix circuit MTRX converts RGB signals from the signal processing circuit PR4 into a color difference signal and a brightness signal. An output of the matrix circuit MTRX is added to an image signal obtained by way of the CCD 1 by means of the adding circuit ADD described hereinabove.

A high-pass filter circuit HPF cuts low frequency components of an output of the CCD 1 and only outputs high frequency components of the output.

An integrator circuit INT integrates an output of the high-pass filter circuit HPF.

A signal processing circuit section AF includes a latch circuit and an analog to digital converter circuit and produces a focus signal. Such focus signal is inputted to the sequence controlling circuit 102 at which focusing control is executed in accordance with a known peak detecting method.

Figure 15:
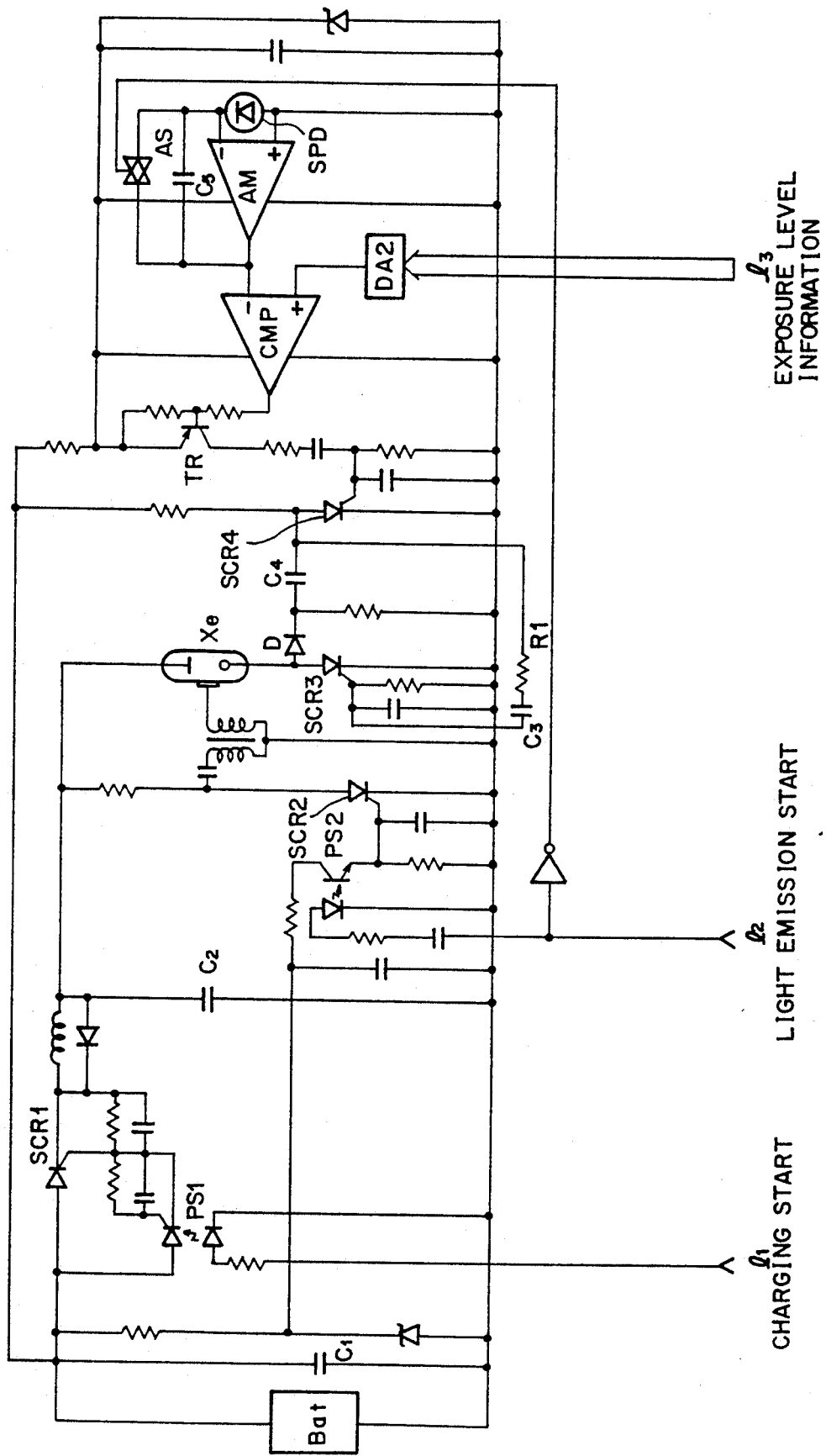
FIG. 15 is an electric circuit diagram of a flash device controlling section of the electric circuit of FIG. 13.

Referring now to FIG. 15, there is shown a detailed electric circuit of the flash controlling section 105 described hereinabove. The electric circuit shown includes a boosting dc-dc converter or boosting circuit Bat. The electric circuit further includes a xenon tube Xe and a light receiving element (SPD) which correspond to the xenon tube 2 and the light receiving element (SPD) 92, respectively, shown in FIG. 13.

The electric circuit further includes a main capacitor C2 for supplying energy for the emission of flashlight and another capacitor C1 for charging the main capacitor C2. The electric circuit further includes a diode D, further capacitors C3 and C4, a resistor R1 and thyristors SCR3 and SCR4 which cooperatively constitute a flashlight emission controlling circuit.

The capacitor C1 is normally charged by the boosting circuit Bat to a potential sufficient for the xenon tube Xe to emit flashlight. When a charging starting signal $l_1$ in the form of a pulse signal of a positive potential is received from the sequence controlling section 102, a photo-thyristor PS1 is changed over into a conducting state so that an electric current flows into the gate of a thyristor SCR1 to put the thyristor SCR1 into a conducting state. After the thyristor SCR1 is put into a conducting state in this manner, charge accumulated in the capacitor C1 is transmitted to the main capacitor C2 so that the capacitor C2 is charged up quickly. Since the capacity of the capacitor C1 is sufficiently large comparing with the capcitor C2, the potential at the capacitor C1 drops but by a very small amount. As the capacitor C2 is charged so that the charged voltage rises toward the voltage of the capacitor C1, the thyristor SCR1 enters a non-conducting state by itself due to a characteristic thereof. The circuit constant of a charging route from the capacitor C1 to the capacitor C2 is set such that the capacitor C2 is charged up in a sufficiently shorter period of time than 1/60 second to put the thyristor SCR1 into a non-conducting state.

When a light emission starting signal $l_2$ in the form of a signal of a positive potential is received from the sequence controlling section 102 while the thyristor SCR1 remains in a non-conducting state, a phototransistor PS2 is put into a conducting state so that an electric current flows into the gate of a thyristor SCR2 to put the thyristor SCR2 into a conducting state. A capacitor and a trans connected in series to the anode of the thyristor SCR2 forms a known light emission trigger circuit, and when the thyristor SCR2 is put into a conducting state, a trigger pulse is produced from the trigger circuit to start emission of light from the xenon tube Xe.

After starting emission of light from the xenon tube Xe, the light thus emitted is received by the light receiving element SPD, and an amount of the thus emitted light is monitored by an integrator circuit constituted from an amplifier AM and a capacitor C5.

An output of the integrator circuit is inputted to one of a pair of input terminals of a comparator CMP while an output of a digital to analog converting section DA2 is inputted to the other input terminal of the comparator CMP. The digital to analog converting section DA2 receives information $l_3$ for the exposure level adjustment such as brightness information of an object or exposure reference information and converts the thus received signal $l_3$ from a digital signal into an analog signal. If the output of the integrator circuit exceeds the output of the digital to analog converting section DA2, then the output of the comparator CMP is changed over to a low level. As a result, a transistor TR is put into a conducting state, and consequently the thyristor SCR4 is put into a conducting state. Consequently, the thyristor SCR3 is put into a non-conducting state so that the xenon tube stops its emission of light. A circuit consisting of the diode D, capacitor C3, resistor R1 and thyristors SCR3 and SCR4 is a conventional circuit which is employed very often in a popular flash device for the photographing, and accordingly, description thereof is omitted herein.

Subsequently, operation of the sequence controlling circuit 102 will be described.

Referring to FIG. 16a, there is illustrated operation of the sequence controlling section 102. If it is detected first at step #1 that a cartridge 3 is inserted into the cartridge loading opening 20 of the housing 60 of the apparatus C, then the sequence advances to step #2 at which the Y-axis motor 76 is driven to rotate to effect loading of the cartridge 3. After completion of such loading, common information in the film memory 4 is read in at step #3. Such common information denotes information common to all of photographed frames of a film and includes, for example, negative/positive information indicating whether the film in the cartridge 3 is a negative film or a positive film, trimming limit information, a title of the cartridge 3, index information corresponding to a list of contents for establishing a corresponding relationship between key words of the individual frames of the film accommodated in the cartridge 3 and serial frame numbers. Against such common information, information peculiar to each of the photographed frames of the film such as, for example, a date of photographing, a photographing condition, a trimming magnification, the center of trimming, vertical/horizontal format photographing information, a comment or a key word for each frame will be hereinafter referred to as frame information. Subsequently at step #4, initial picture data is produced using the information read in at step #3. Thus, information and a control signal are outputted to the image information converting section 101. Consequently, the image controlling section IC shown in FIG. 14 reads out necessary data from the storage circuit ROM in response to such information and control signal and stores the read data successively into the memory MEM2. After completion of production of such data, the sequence advances to step #5 at which the sequence controlling section 102 delivers a control signal again to the image information converting section 101 so that the data stored in the memory MEM2 is transferred to the adding circuit ADD by way of the signal processing circuit PR4 and matrix circuit MTRX. In this instance, since the CCD 1 does not yet operate, no signal is transmitted to the other input of the adding circuit ADD. Accordingly, only an output of the matrix circuit MTRX is delivered as an output of the adding circuit ADD and is thus outputted as a video signal by way of the signal converting circuit PR3. Subsequently at steps #6 and #7, the serial frame number of the film, the X- and Y-axis positions of the cartridge 3, the position of the zoom lens 5, the position of the focusing lens group and the rotational position of the image rotating prism 6 are set to their individual initial positions by the individual driving sections.

Subsequently at step #8, it is waited that a frame from which a video signal is to be extracted is selectively set, and after completion of such selecting operation, frame information regarding the selected frame is read in. Such setting of a frame may be performed in accordance with a method wherein the film is fed frame by frame manually or automatically until a desired frame is reached or with another method wherein the serial frame number is set directly. In order to effect setting with a key word, index information may be used to select a serial frame number corresponding to the key word.

After such frame setting, a signal is outputted, at step #9, to the film feeding section 106 to retrieve the set frame. Then at step #10, movement of the cartridge 3 in the X- and Y-axis directions and driving of the zoom lens 5 and image rotating prism 6 are performed in accordance with the trimming center information, trimming magnification information and vertical/horizontal format photographing information in the frame information inputted at step #8. After setting of the trimming magnification and trimming center and rotating movement of an image are performed in accordance with the information, exposure operation is performed at step #11. It is to be noted that an interruption which will be hereinafter described is disabled at the present point of time.

Driving of the CCD 1 and emission of flashlight from the xenon tube 2 are performed only once in synchronism with a signal which is produced for each 1/60 second from a signal generating source (not shown) of the sequence controlling section 102. Flashlight thus emitted is monitored by the SPD 92, and when an appropriate amount of light for the CCD 1 is generated, the emission of light is stopped. In this instance, energy for the emission of light is immediately accumulated into the main capacitor C2 in order to prepare for the next emission of light. This will be hereinafter described. Subsequently at step #12, image data is read out from the CCD 1. Such image data is recorded from the signal processing circuit PR1 shown in FIG. 14 into the memory circuit MEM1 by way of the analog to signal converting circuit AD and is simultaneously inputted as a focus signal to the sequence controlling section 102 by way of the high-pass filter HPF, integrator circuit INT and signal processing circuit AF. At step #13, focusing control is executed in response to the focus signal thus inputted. Such focusing is performed in accordance with a peak detecting method wherein a portion of an output of the CCD 1 which presents a maximum amount of high frequency components is regarded as an in-focus portion. Such focusing proceeds in the following manner. In particular, high frequency components at two different positions of the focusing lens are compared with each other, and the lens is moved a little toward the greater high frequency component side. Then, the high frequency components at the preceding lens position are compared with those at a present lens position, and if the high frequency components are greater at the present position, the lens is moved a little similarly in the same direction. If such a sequence of operations is repeated, then the high frequency components are increased little by little and the lens gradually approaches a correct in-focus position. Then, if the lens is moved farther than the correct in-focus position, then the high frequency components are decreased now. Thus, the lens is stopped at a position immediately before such decrease of the high frequency components begins as an appropriate in-focus position.

It is to be noted that, in case frame setting is effected anew, the processing at steps #11 to #13 is repeated until an in-focus condition is determined.

Subsequently at step #14, the image data recorded in the memory circuit MEM1 is read out and processed by the signal processing circuit PR2 while information of a key word, a date and so forth is taken into the memory circuit MEM2 and processed by the signal processing circuit PR4.

At step #15, signals obtained by such processing are sent out as output video signals to the outside. At the present point of time, an interruption which will be hereinafter described is enabled.

At subsequent steps #16 and #17, processing for zooming and panning is executed.

When zooming or panning is performed, it is preferable to output, also during driving for such processing, a video signal in response to such driving and to display an image on a television screen in order to facilitate operation and promote enjoyment of an operator.

In this instance, it is necessary to continuously read an output of the CCD 1. Accordingly, while driving control of the motors at step #17 is being executed, the sequence returns to step #11 to repeat the processing described above. Processing at steps #16 and #17 will be hereinafter described in detail.

In case no zooming operation nor panning operation is proceeding at step #16, the sequence advances to step #18 at which it is judged whether or not an in-focus condition is reached. If an in-focus condition is not yet reached, the sequence returns to step #11.

If the processing from step #11 to step #17 or to step #18 is repeated, then new image information is read out successively for each 1/60 second because such reading is executed in response to the synchronizing signal described above. Further, since in this instance image information need not be recorded into the memory each time processing for one cycle is executed, a signal from the signal processing circuit PR1 in FIG. 14 is directly outputted by way of the multiplexer MPX.

Meanwhile, in case an in-focus condition is determined at step #18, the sequence advances to step #19 at which it is judged whether or not a new frame has been set, and if no new frame is set, then the sequence advances to step #20 at which it is judged whether or not a manual operation for the ejection of the cartridge 3 has been performed.

If an ejecting operation of the cartridge 3 has not been performed, then the sequence returns to step #16 to repeat the processing at steps #16, #18, #19 and #20 to wait while monitoring whether a manual zooming or panning operation or setting of a new frame is performed or a manual cartridge ejecting operation is performed. Naturally in the meantime, video signals are successively outputted in accordance with contents of data of the memory circuits MEM1 and MEM2.

If setting of a new frame is judged at step #19, the sequence returns to step #8 in order to repeat such processing as described above.

On the other hand, if a manual ejecting operation of the cartridge 3 is judged at step #20, then the sequence advances to step #21. At step #21, outputting of a video signal from the image information converting section 101 is stopped. Then at step #22, the film is rewound to its initial condition. At subsequent step #23, the X- and Y-axis positions of the cartridge and the zooming position of the lens are returned to their individual initial positions. Then at step #24, the Y-axis motor 76 is controlled to eject the cartridge 3 from the housing 60 of the apparatus C. After then, the sequence returns to step #1 to wait that a cartridge 3 is inserted again into the apparatus.

Subsequently, interrupt processing will be described with reference to FIG. 16b. Such interrupt processing is executed in response to an interrupting operation, that is, a manual operation of the manual operation button 31 shown in FIG. 2, in order to output an initial picture, that is, a video signal to be outputted at first after a cartridge 3 is loaded in position anew. In particular, at steps #25 and #27, initial picture data is produced and then outputted similarly as at steps #4 and #5 described hereinabove. At step #26 subsequent to step #25 and preceding to step #27, outputting of a signal from the multiplexer MPX which has been outputted so far is stopped. At step #28 subsequent to step #27, it is waited that the manual interrupting operation is cancelled, and then at step #29, in order to restore outputting of the signal before the present interrupt processing is started, an image signal from the multiplexer MPX is outputted while contents of the memory circuit MEM2 are corrected to data of the relevant frame and outputted, whereafter the processing before starting of the interrupt processing is restored.

The reason why an interruption is disabled during the processing at steps #11 to #15 is that it is intended to prevent such a possible trouble that, otherwise if an interruption takes place during the processing, then driving of the CCD 1 may be put out of synchronization or information of the CCD 1 may be varied.

Figure 17:
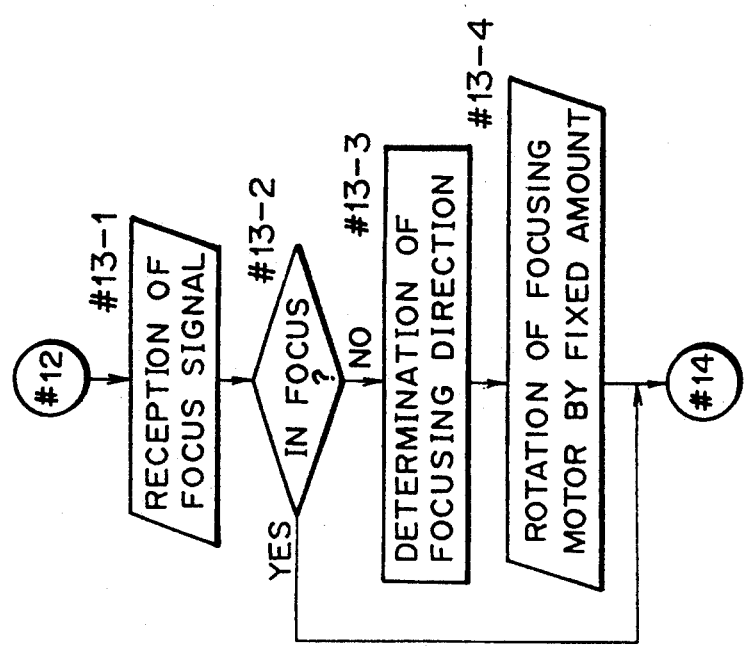

Referring now to FIG. 17, details of focusing control at step #13 in FIG. 16a are illustrated. If a focus signal is received from the signal processing circuit AF at step #13-1, then the signal received in the preceding control cycle is compared with the signal received in the present control cycle at step #13-2 in order to determine whether or not an in-focus condition is reached. The direction toward a side at which the signal is higher is a direction in which the lens is to be moved toward an in-focus position, and such direction is determined at step #13-3.

Then at step #13-4, the focusing motor 110 is driven to rotate by a predetermined amount in the direction determined at step #13-3. Then, when the processing at subsequent step #14 et seq. is executed and then the processing at steps #13-1 and #13-2 is executed again, if the latest focus signal is higher than the preceding focus signal, the same operation is repeated again. If the processing is repeated, then the latest focus signal finally becomes lower than the preceding focus signal. At step #13-2, the position corresponding to the preceding focus signal then is determined as an in-focus position.

Figure 18:
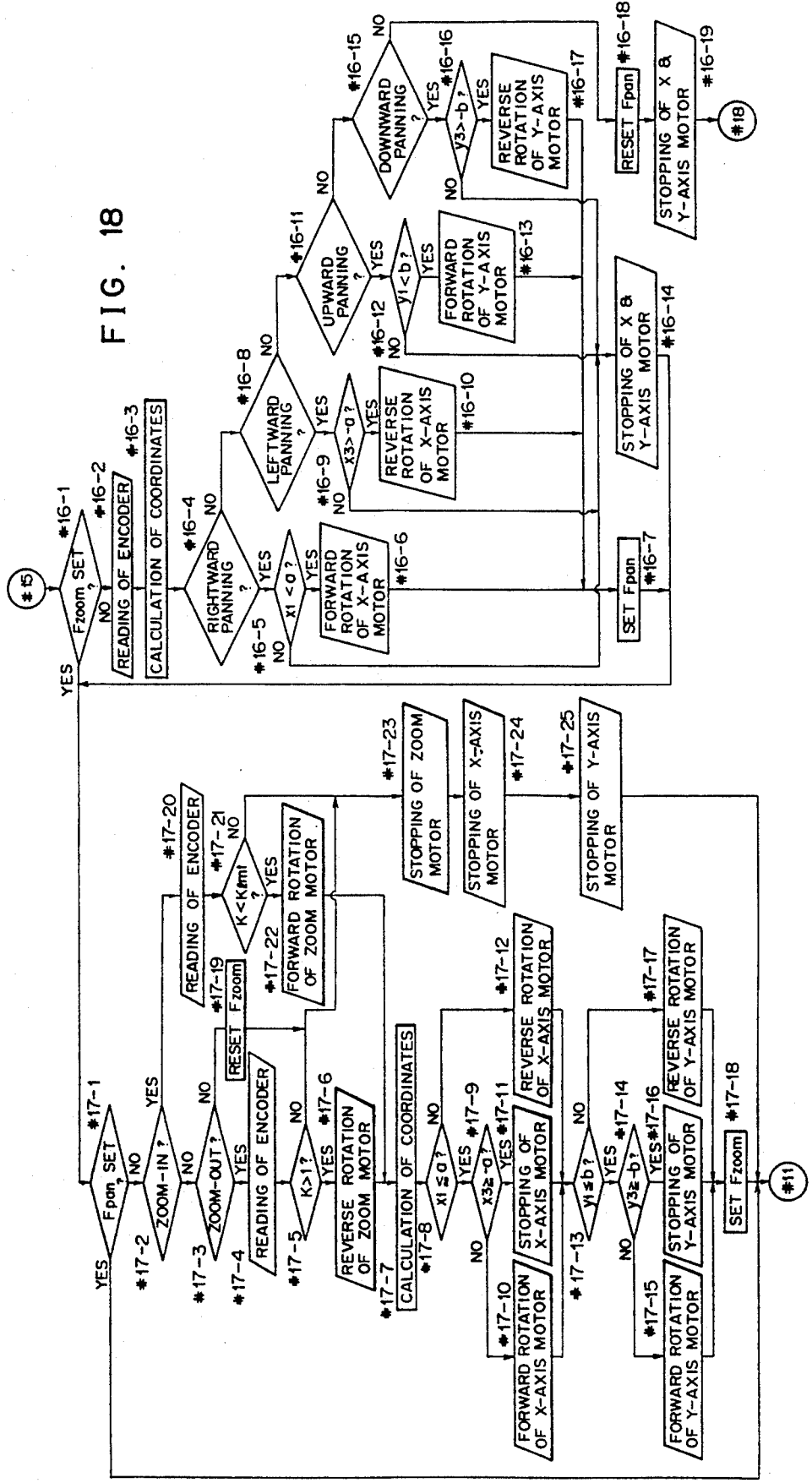

Referring now to FIG. 18, details of processing at steps #16 and #17 in FIG. 16a are illustrated. It is judged first at step #16-1 whether or not a flag Fzoom which indicates, when it is in a set state, that zooming processing is proceeding is in a set state. If the flag Fzoom is in a set state and hence zooming processing is proceeding, the sequence advances to step #17-1 and panning processing described below is not executed.

In case the flag Fzoom is not in a set state at step #16-1, a value of the encoder 111 for detecting a zooming position of the lens is read first at step #16-2. The value of the encoder 111 corresponds to a trimming magnification. Then at step #16-3, it is detected from the current trimming center and the trimming magnification what range of the film is being trimmed.

Such trimming magnification can be detected from a value of the encoder 111 while the trimming center can be detected by counting numbers of steps by which the X-axis motor 67 and the Y-axis motor 76 have individually moved from their initial positions. Here, a method of determining a range of trimming is described with reference to FIG. 19.

The center of a film Q is taken as the origin (0, 0) while the leftward and rightward direction is taken as an x-axis and the upward and downward direction is taken as a y-axis. Coordinates of individual corners of the film Q are represented by (a, b), (a, -b), (-a, -b) and (-a, b) while the trimming center moved by panning is represented by ($x_0$, $y_0$).

Coordinates of individual corners of a range R narrowed by zooming are represented by ($x_1$, $y_1$), ($x_2$, $y_2$), ($x_3$, $y_3$) and ($x_4$, $y_4$), and a trimming magnification is represented by K. In this instance, the following equations stand.

$$(x_1, y_1) = \frac{1}{K}(a, b) + (x_0, y_0)$$

$$(x_2, y_2) = \frac{1}{K}(a, -b) + (x_0, y_0)$$

$$(x_3, y_3) = \frac{1}{K}(-a, -b) + (x_0, y_0)$$

$$(x_4, y_4) = \frac{1}{K}(-a, b) + (x_0, y_0)$$

A trimming range is determined in accordance with the equations given above.

Referring back to FIG. 18, it is detected at step #16-4, #16-8, #16-11 or #16-15 whether or not a panning operation is performed, that is, whether or not any of the panning buttons 27 to 30 is manually operated. If a panning operation in the rightward, leftward, upward or downward direction is being performed, the sequence advances to step #16-5, #16-9, #16-12 or #16-16 in accordance with the direction of the panning operation. At each of such steps, it is detected whether or not such panning causes the trimming range to be partially protruded from an image area of the film.

Referring again to FIG. 19, the range Q defined by the coordinates (a, b), (a, −b), (−a, −b) and (−a, b) represents an image area of the film while a range defined by the coordinates ($x_1$, $y_1$), ($x_2$, $y_2$), ($x_3$, $y_3$) and ($x_4$, $y_4$) is the trimming range R.

Figure 19:
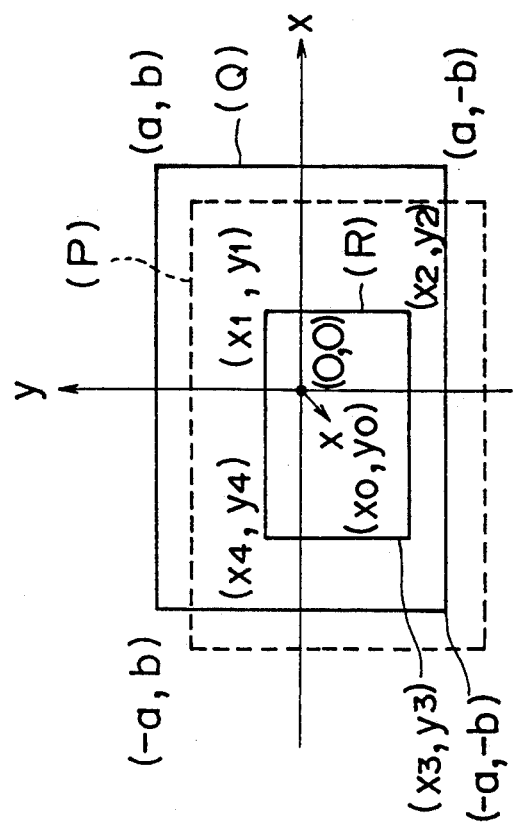
FIG. 19 is a diagram illustrating a relationship between a trimming range and an image range of a film.

In this instance (the trimming range is R), there is no trouble since the trimming range R remains within the film image range Q. However, even if the trimming center is the same, if the trimming magnification is different, then the trimming range may be such, for example, as a block P indicated by a broken line in FIG. 19. As seen in FIG. 19, the trimming range P is partially protruded from the image range Q. If an image within the trimming range P is picked up and displayed on a television screen, then such protruded portion appears very ugly. Thus, it is detected at any of steps #16-5, #16-9, #16-12 and #16-16 that the trimming range is not protruded in any direction from the image range, and after then, the X-axis motor 67 or Y-axis motor 76 is driven to rotate in the relevant direction at step #16-6, #16-10, #16-13 or #16-17. Then, directly before the trimming range is protruded from the image range, the sequence advances to step #16-14 at which the X-axis motor 67 or Y-axis motor 76 is stopped immediately to stop the panning operation, whereafter the sequence advances to step #17-1.

After a panning operation is started at step #16-6, #16-10, #16-13 or #16-17, a flag Fpan which indicates, when it is in a set state, that a panning operation is proceeding is set at step #16-7, and then the sequence advances to step #17-1.

On the other hand, if no panning is proceeding, then the flag Fpan is reset at step #16-18, and then the X-axis motor 67 or Y-axis motor 76 is stopped at step #16-19, whereafter the sequence advances to step #18 of FIG. 16a.

At step #17-1, the flag Fpan is checked. If the flag Fpan is in a set state (a panning operation is proceeding), then the sequence advances directly to subsequent step #11 without performing a zooming operation. On the contrary, if no panning operation is proceeding, that is, the flag Fpan is in a reset state at step #17-1, then it is judged at steps #17-2 and #17-3 whether or not a zooming operation has been performed, that is, whether or not either one of the zoom up button 25 and zoom down button 26 is manually operated. In case a zoom-in operation, that is, an operation to narrow the trimming range, is judged, a trimming magnification K then is read from the encoder 111 at step #17-20, and then it is judged at step #17-21 whether or not the trimming magnification K has reached a trimming limit magnification Klmt. Such trimming limit magnification Klmt is a constant which depends upon a relationship between a graininess of the film and a number of picture elements of a television screen and is a trimming limit magnification of a television set at which it is judged that an image is magnified so high by trimming that particles of the film are conspicuous with respect to picture elements on the television screen and the image cannot be appreciated well. Particularly, the trimming limit magnification Klmt is determined from trimming limit information in peculiar information to the film, and three times or so of a trimming limit upon photographing is determined as a trimming limit upon appreciation on a television screen.

In case the trimming magnification K has not yet reached the trimming limit magnification Klmt at step #17-21, the zooming motor 91 is energized to rotate forwardly at step #17-22.

On the other hand, in case a zoom-out operation, that is, an operation to widen the trimming range, is judged at step #17-3, a current trimming magnification K is determined from the encoder 111 at step #17-4. Then at step #17-5, it is judged whether or not the trimming magnification K is greater than 1, and if K>1, then the zooming motor 91 is energized to rotate reversely at step #17-6.

On the other hand, in case it is judged at steps #17-2 and #17-3 that no zooming operation is performed, the flag Fzoom is reset at step #17-19. Thus, when no zooming operation is performed or in case K≧Klmt (step #17-21) or K≦1 (step #17-5), the sequence advances to step #17-23 at which the zooming motor 91 is stopped. After then, the X-axis motor 67 and Y-axis motor 76 are stopped at steps #17-24 and #17-25, respectively, whereafter the sequence advances to step #11.

After the zooming motor 91 is energized to rotate forwardly or reversely at step #17-22 or #17-5 in response to a manual zooming operation, coordinates of a trimming range are calculated at step #17-7 in a similar manner as at step #16-3.

Such calculation is executed in order to prevent the possibility that the trimming range may be protruded from the image range Q of the film also as a result of zooming.

Subsequently at step #17-8, it is judged whether or not the trimming range is protruded rightwardly from the image range Q, and at step #17-9, it is judged whether or not the trimming range is protruded leftwardly from the image range Q. In case the trimming range is protruded rightwardly, the X-axis motor 67 is energized at step #17-12 to move the trimming center leftwardly a little. On the contrary if the trimming range is protruded leftwardly, the X-axis motor 67 is energized at step #17-10 to move the trimming center rightwardly a little. On the other hand, if the trimming range is not protruded in either of the leftward and rightward directions, the X-axis motor 67 is stopped at step #17-11. Also with regard to the upward and downward directions, the Y-axis motor 76 is controlled so that the trimming range may not be protruded from the image range of the film (steps #17-13 to #17-17).

After then, the flag Fzoom is set at step #17-18, and then the sequence advances to step #11 shown in FIG. 16a.

Referring now to FIG. 20, there is illustrated retrieving and setting processing of a frame at steps #9 and #19 shown in FIG. 16a.

Normally, a film includes a plurality of frames arranged in a row in an order in which photographs have been taken, and such frames may include some frames which have failed in photographing or some frames which are not desired to appreciate. However, when images of such frames are to be observed actually on a television screen, they are not necessarily displayed in the order of photographing, and some of them which are not desired to appreciate should be skipped.

Thus, the present system is constituted such that information designating an order of appreciation or information indicating that a frame should not be displayed on a television screen can be inputted by way of the editor 7 so that those frames which are desired to appreciate can be appreciated in an order in which they are desired to appreciate.

In particular, first at step #9-1, it is judged whether or not a counter B is equal to another counter C. The counter B is set in advance to an actual serial number of a frame on the film to be retrieved subsequently while the counter C is set to another actual serial number of a frame on the film which is in selection at present. If the current frame is equal to the frame to be retrieved ((counter B)=(counter C)), then there is no necessity of driving the film feeding motor 69, and accordingly, the motor 69 is stopped at step #9-11. If the current frame is not equal to the frame to be retrieved subsequently, then the counter B is compared with the counter C at step #9-2. In case the counter B is greater than the counter C, the film must be fed forwardly, and accordingly, the film feeding motor 69 is energized to rotate forwardly at step #9-3. Then at step #9-4, it is waited that a signal indicating that the film has been fed by one frame distance is received from the frame detecting photocoupler 82. Then, after such signal is received, the counter C is incremented by one at step #9-5. Then at step #9-6, the counter B is compared with the counter C again at step #9-6, and the processing at steps #9-4 and #9-5 is repeated until they coincide with each other. The frame detecting photocoupler 82 produces an output signal each time a mark applied to each of the frames of the film is detected. It is to be noted that a photocoupler for detecting a perforation of a film and a counter for counting a signal from the photocoupler may be employed in place of the frame detecting photocoupler 82 such that a signal may be produced when a predetermined number of (for example, 8) perforations are detected.

In case the counter C is greater than the counter B at step #9-2, the film must be fed reversely, and accordingly, the film feeding motor 69 is energized to rotate reversely at step #9-7. Then, similarly as in the case when the film is fed forwardly, the processing at steps #9-8, #9-9 and #9-10 is repeated until coincidence between the counters B and C is reached. If the film is fed forwardly or reversely to the position of the set frame and coincidence between the counters B and C is reached, then the motor 69 is stopped at step #9-11, whereafter the sequence advances to step #11 shown in FIG. 16a. By such sequence of operations as described above, an image of a desired frame of the film can be appreciated.

Subsequently, details of the processing at step #19 will be described. At steps #19-1, #19-7, #19-8 and #19-12, it is judged in which mode for the setting of a frame the apparatus is. An automatic feeding mode which is checked at step #19-1 is a mode in which a next frame is set automatically after lapse of a fixed interval of time. Accordingly, when the apparatus is in the automatic feeding mode, it is waited at step #19-2 that a fixed interval of time elapses. Meanwhile, it is detected at step #19-7 whether or not the switch 23 for feeding a film frame by frame is depressed. When the switch 23 is depressed or in case the apparatus is in the automatic feeding mode and the fixed interval of time has elapsed, a further counter A is incremented by one at step #19-3.

The counter A represents a number which is not an actual serial number of a frame on a film but a serial number representative of a number in order of displaying determined in advance by edition by a user. Accordingly, if the counter A is greater at step #19-4 than a predetermined value END, then the value END is placed into the counter A. The value END represents a serial number of a last one of frames in order determined by edition by a user and coincides with a value of a total number of photographed frames of the film in the cartridge subtracted by a number of frames which are not desired to appreciate.

On the other hand, at step #19-8, it is detected whether or not the switch 24 for feeding a film frame by frame reversely has been depressed, and if the switch 24 is depressed, then the counter A is decremented by one at step #19-9, whereafter it is detected at step #19-10 whether or not the counter A is equal to 0.

In case the counter A is equal to 0 at step #19-10, the counter A is set to 1 at step #19-11.

In the meantime, at step #19-12, it is judged whether or not a serial frame number has been set directly by way of the ten keys 33. In case a serial frame number is set directly, the value thus set is placed into the counter A at step #19-13. It is to be noted that a user will set a serial frame number after edition.

If no setting of a serial frame member is performed, the sequence advances from step #19-12 to step #20 shown in FIG. 16a.

On the contrary, if the counter A has some value set thereto, the sequence advances to step #19-6 at which it is determined from index information to what frame of the actual film the frame of the set value of the counter A corresponds, and a serial number of the frame on the actual film thus determined is placed into the counter B.

Figure 21B:
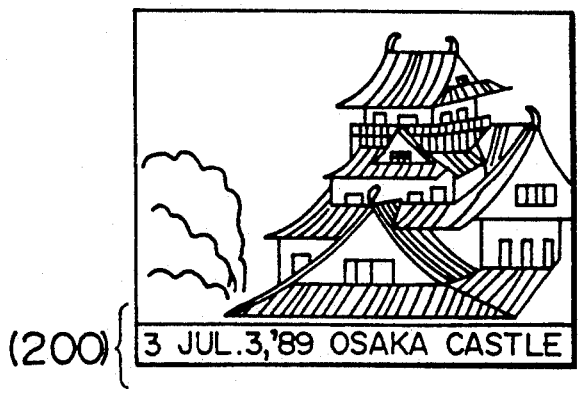
FIGS. 21a, 21b and 21c show different exemplary indications on a television screen provided by means of the system of the present invention.
Figure 21C:
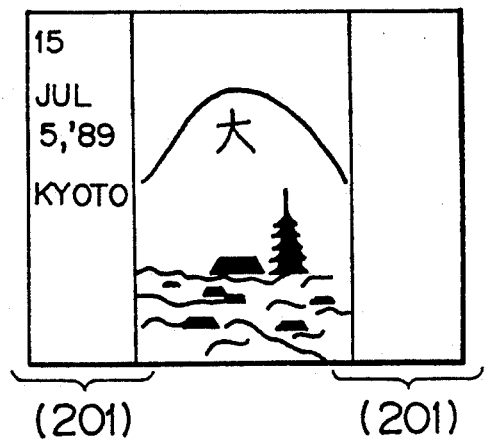
Figure 21A:
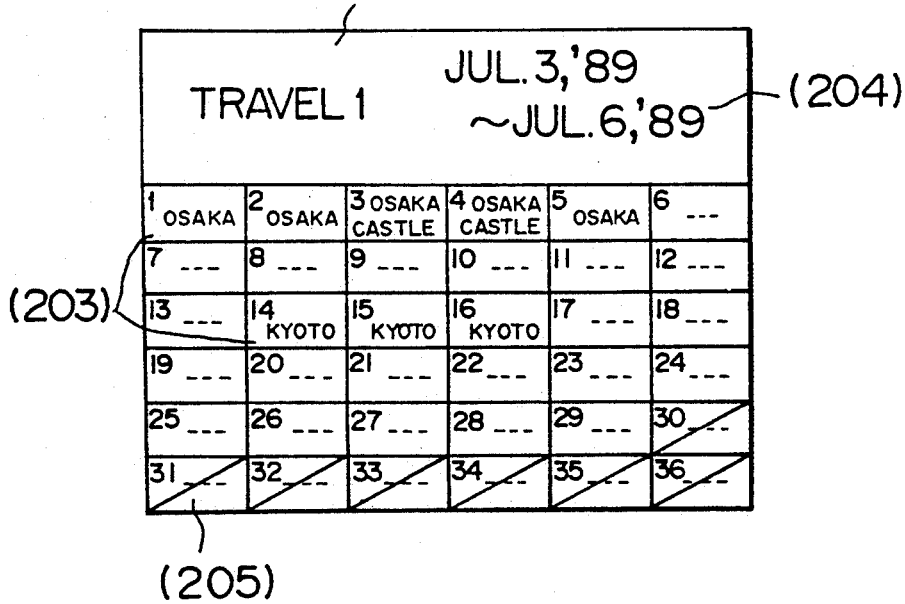

Referring now to FIGS. 21a to 21c, there are shown some images to be displayed exemplarily by means of the present system.

FIG. 21a illustrates an indication on a television screen of a video signal which is outputted upon loading of a cartridge 3 or upon an interrupting operation. A title 202 of the cartridge 3, a period 204 of photographing and key words 203 for individual frames of the film of the cartridge 3 are displayed on the screen.

Slash marks 205 for the frames of the serial frame number 30 et seq. represent those frames which were determined to be unnecessary in appreciation on a television screen by a user. Thus, a frame to which a slash 205 is applied is excepted from an object for the retrieval.

FIG. 21b illustrates an indication on a television screen of an image by ordinary horizontal format photographing.

If a photograph is displayed on a television screen without changing the aspect ratio of a film format thereof, then an area 200 in which the image is not displayed on the television screen remains due to a difference in aspect ratio between the television screen and the film format. Thus, information regarding the frame can be indicated making use of the area 200. In the example shown in FIG. 21b, a serial frame number, a date of photographing and a key word are indicated in the area 200.

FIG. 21c illustrates an indication on a television screen of an image by vertical format photographing. Also in this instance, an area or areas 201 in which the image is not displayed remain due to a difference in aspect ratio. Then, information regarding the frame is indicated in an area 201 in which the image is not displayed.

While in the embodiment described above a semiconductor memory is employed as a storage medium of information, magnetic storage means such as a magnetic sheet or a magnetic tape or optical storage means such as an optical card or a film in which information is photographed together with an image may be employed as such storage medium. Meanwhile, since the method of trimming is achieved by zooming of the lens and movement of a cartridge in the X and Y directions, it may be achieved otherwise by electric processing of a serial image number or else by a combination of both means.

Further, while a cartridge is moved in the X and Y directions, alternatively the CCD may be moved in such directions.

While rotation of an image is achieved using a prism, alternatively the CCD may be rotated or else an image according to methods known to those skilled in the art may be rotated by electric processing of an image.

The shape of a cartridge is not limited particularly to that of the embodiment described above. For example, a cartridge may be a jacket film (as is used with a microfilm) in the form of a sheet wherein a film is held between a pair of transparent sheets, or may be of a single reel type wherein a containing chamber for a film is provided only one side of the cartridge. Further, where a cartridge is used also as a photographing film cartridge, transfer of information is unnecessary. Further, while the shutter of a cartridge in the embodiment described above is of the folding door type, it may otherwise be of the slide type.

While a xenon tube is employed as an illuminating light source for the photographing, some other illuminating light source such as a fluorescent lamp, a halogen lamp, an electroluminescent panel or a light emitting diode may otherwise be employed.

While exposure control is executed by adjustment of an amount of light to be emitted from a xenon tube, it may otherwise be executed by controlling an accumulation time of a charge coupled device or by adjustment of an amount of incident light to a charge coupled device by means of an aperture mechanism or the like. Further, if a range of light measurement is made corresponding to trimming, then further appropriate exposure control can be achieved.

While focusing control is executed using a charge coupled device, it is not always necessary depending upon mechanical precision.

Having now fully described the invention, it will be apparent to one of ordinary skill in the art that many changes and modifications can be made thereto without departing from the spirit and scope of the invention as set forth herein.

What is claimed is:

1. An image reproducing device, comprising:
   means for projecting an image recorded on a film, the projecting means including an image forming optical system;
   means for producing an electrical image signal on the basis of the projected image;
   first reading means for reading trimming information representing an area of the image to be reproduced, the trimming information being recorded on a record medium when the image has been recorded on the film;
   second reading means for reading format information representing whether the image has been recorded on the film in a vertical format or in a horizontal format, the format information being recorded on the record medium when the image has been recorded on the film;
   means for making the producing means produce the electrical image signal corresponding to the area to be reproduced in accordance with the trimming information; and
   means for rotating the image to be reproduced by driving the image forming optical system in accordance with the format information.

2. An image reproducing device as claimed in claim 1, wherein the image forming optical system of said projecting means includes an image rotating prism, and said rotating means rotates the image to be reproduced by driving the image rotating prism.

3. An image reproducing device as claimed in claim 1, wherein the image forming optical system of said projecting means includes a zoom lens system, and said making means includes means for driving the zoom lens system.

4. An image reproducing device, comprising:
   means for projecting an image recorded on a film;
   means for producing an electrical image signal on the basis of the projected image;
   first reading means for reading trimming information representing an area of the image to be reproduced, the trimming information being recorded on a record medium when the image has been recorded on the film;
   second reading means for reading format information representing whether the image has been recorded on the film in a vertical format or in a horizontal format, the format information being recorded on the record medium when the image has been recorded on the film;
   means for making the producing means produce the electrical image signal corresponding to the area to be reproduced in accordance with the trimming information; and means for rotating the image to be reproduced by electrically processing the electrical image signal in accordance with the format information.

5. An image reproducing device as claimed in claim 4, further comprising means for reproducing a secondary image on a display device in accordance with the electrical image signal produced by said producing means.

6. An image reproducing device as claimed in claim 4, further comprising means for printing a secondary image in accordance with the electrical image signal produced by said producing means.

7. An image reproducing device as claimed in claim 4, further comprising means for memorizing a secondary image onto an optical disk in accordance with the electrical image signal produced by said producing means.

8. An image reproducing device, comprising:
   means for projecting an image recorded on a film;
   means for producing an electrical image signal on the basis of the projected image;
   means for reading format information representing whether the image has been recorded on a film in a vertical format or in a horizontal format, the format information being recorded on a record medium when the image has been recorded on the film; and
   means for rotating the image to be reproduced by electrically processing the electrical image signal in accordance with the format information.

* * * * *